US010823990B2

(12) United States Patent
Acreman et al.

(10) Patent No.: US 10,823,990 B2
(45) Date of Patent: Nov. 3, 2020

(54) BISTABLE SWITCHABLE LIQUID CRYSTAL PRIVATE DEVICE

(71) Applicant: Sharp Kabushiki Kaisha, Osaka (JP)

(72) Inventors: Andrew Acreman, Oxford (GB); Nathan James Smith, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 70 days.

(21) Appl. No.: 15/981,030

(22) Filed: May 16, 2018

(65) Prior Publication Data

US 2019/0353944 A1 Nov. 21, 2019

(51) Int. Cl.
*G02F 1/13* (2006.01)
*G02F 1/1335* (2006.01)
(Continued)

(52) U.S. Cl.
CPC ............ *G02F 1/1323* (2013.01); *G02F 1/137* (2013.01); *G02F 1/1337* (2013.01); *G02F 1/13362* (2013.01); *G02F 1/133528* (2013.01); *G02F 1/134309* (2013.01); *G02F 2001/133738* (2013.01); *G02F 2001/133742* (2013.01); *G02F 2201/122* (2013.01)

(58) Field of Classification Search
CPC ............ G02F 1/134309; G02F 1/1323; G02F 1/133528; G02F 1/13362; G02F 1/1337; G02F 1/137; G02F 2201/122; G02F 2001/133738; G02F 2001/133742
USPC .......................................... 349/15, 123–131
See application file for complete search history.

(56) References Cited

U.S. PATENT DOCUMENTS 5,825,436 A 10/1998 Knight
5,831,698 A 11/1998 Depp et al.
(Continued)

FOREIGN PATENT DOCUMENTS

GB 2405544 3/2005
JP 3607272 1/2005
JP 2005-078093 3/2005

*Primary Examiner* — Charles S Chang
(74) *Attorney, Agent, or Firm* — Renner, Otto, Boisselle & Sklar, LLP

(57) ABSTRACT

A switchable view angle control device includes an electrically switchable zenithal bistable liquid crystal display view angle control liquid crystal device (ZBD view angle control LCD) that is operable in a first state and a second state; a front polarizer located on a viewing side of the switchable ZBD view angle control LCD; and a polarized light source located on a non-viewing side of the switchable ZBD view angle control LCD that emits light that is polarized in a first direction. When the switchable ZBD view angle control LCD in the first state, the view angle control device operates in a narrow angle view mode in which the polarization of the light from the polarized light source is changed by the switchable ZBD view angle control LCD to be polarized in a second direction that is at least partially absorbed by the front polarizer, and on-axis light passes through the switchable ZBD view angle control LCD and the front polarizer. When the switchable ZBD view angle control LCD is in the second state, the view angle control device operates in a wide angle view mode in which the polarization state of the light from the polarized light source is not changed by the switchable ZBD view angle control LCD and passes through the front polarizer.

21 Claims, 18 Drawing Sheets

(51) Int. Cl.
*G02F 1/13357* (2006.01)
*G02F 1/1337* (2006.01)
*G02F 1/1343* (2006.01)
*G02F 1/137* (2006.01)

(56) References Cited

U.S. PATENT DOCUMENTS

| | | |
|---|---|---|
| 5,877,829 A | 3/1999 | Okamoto et al. |
| 6,211,930 B1 | 4/2001 | Sautter et al. |
| 6,249,332 B1 | 6/2001 | Bryan-Brown et al. |
| 7,019,795 B2 | 3/2006 | Jones |
| 8,698,718 B2 | 4/2014 | Gass et al. |
| 2002/0158967 A1 | 10/2002 | Janick et al. |
| 2005/0062919 A1* | 3/2005 | Bryan-Brown ...... G02F 1/13378 349/123 |
| 2005/0243265 A1* | 11/2005 | Winlow ............... G02F 1/13471 349/178 |
| 2007/0040780 A1* | 2/2007 | Gass ................. G02F 1/134363 345/87 |
| 2013/0342512 A1 | 12/2013 | Smith et al. |
| 2015/0042704 A1 | 2/2015 | Smith et al. |

* cited by examiner

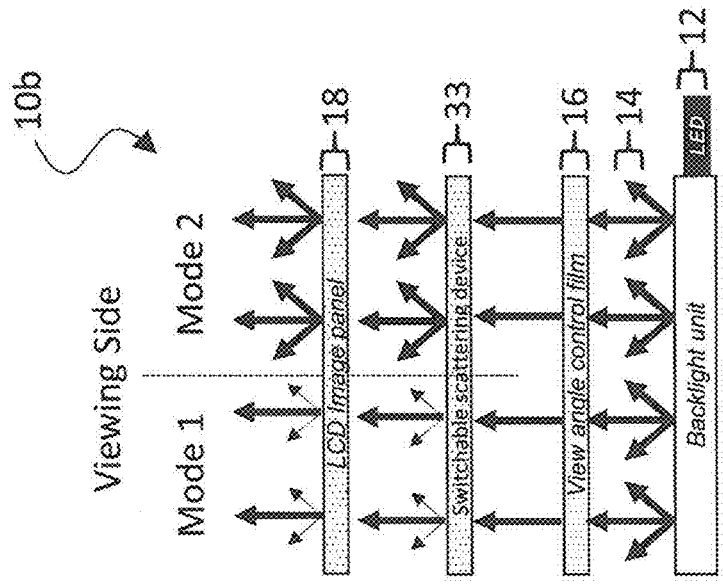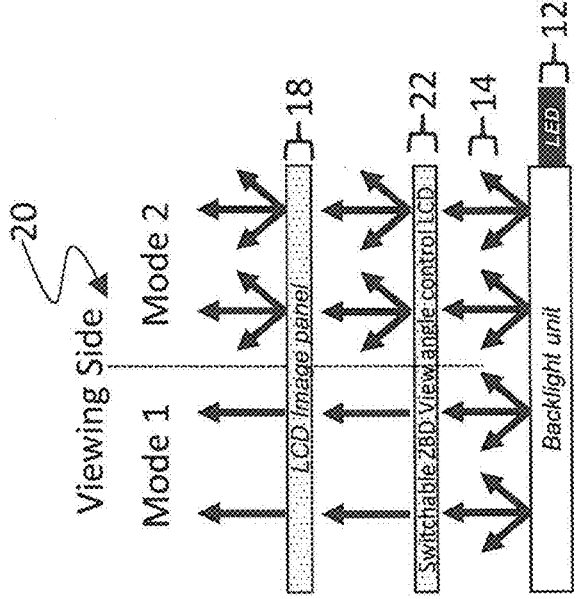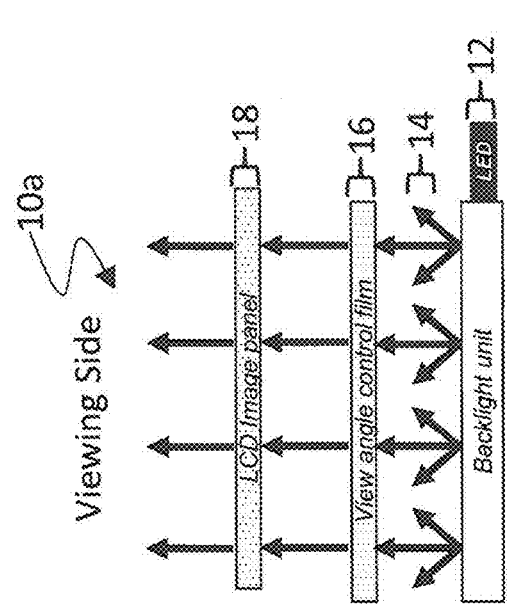

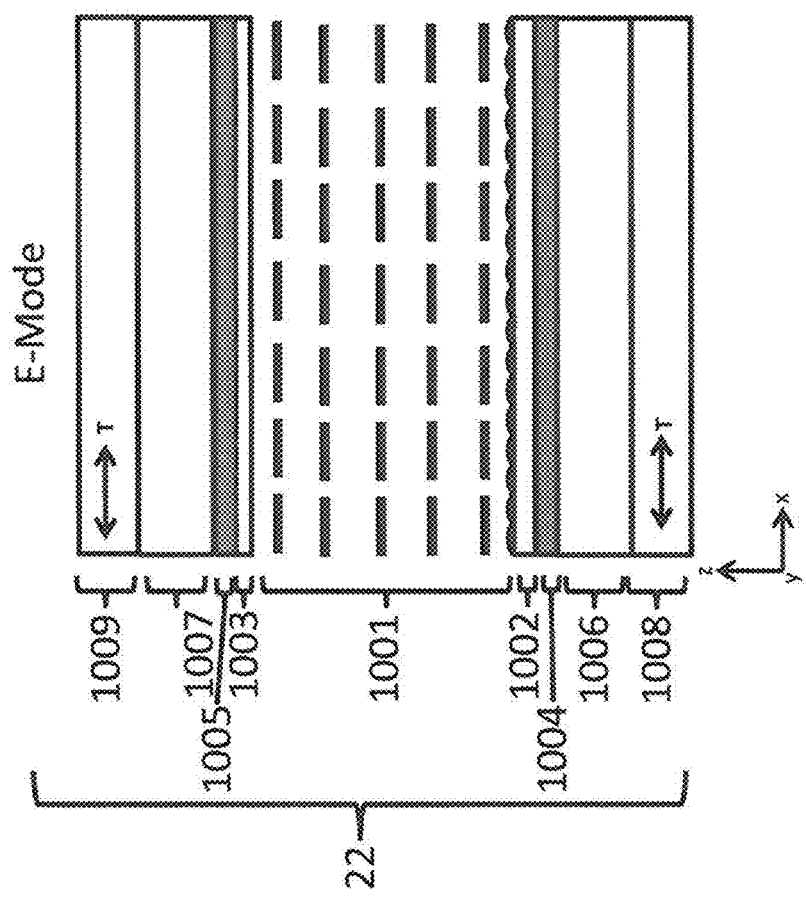
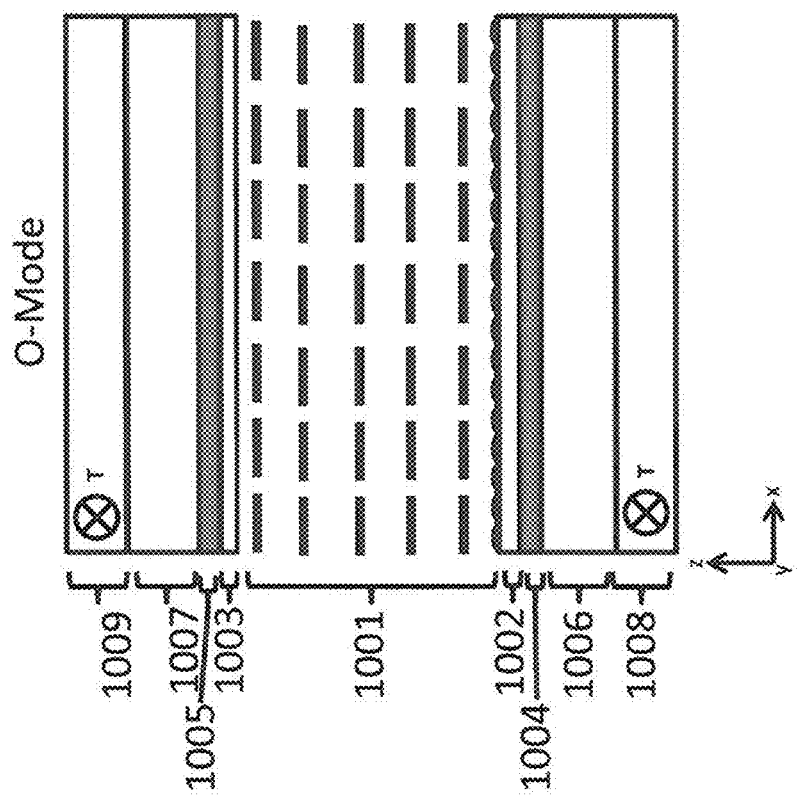
Fig. 4

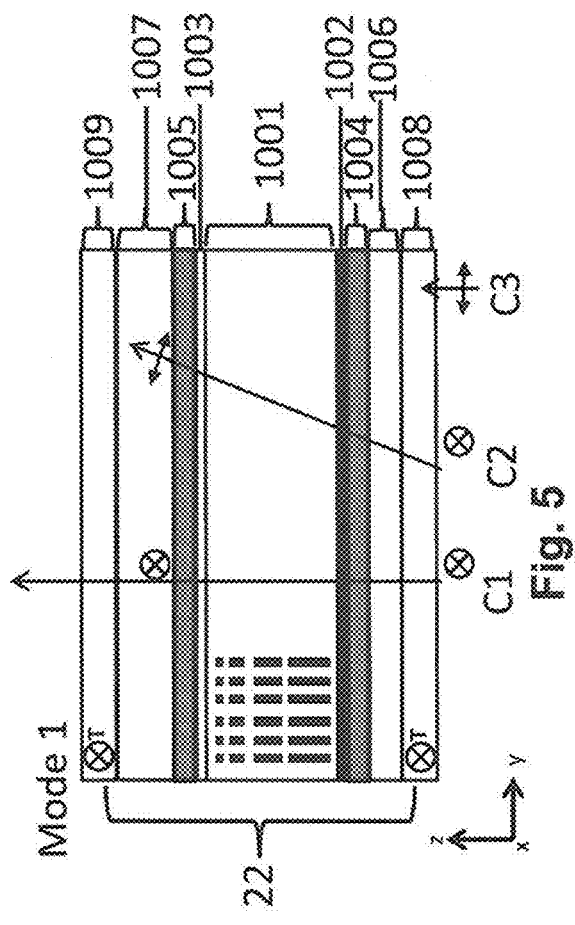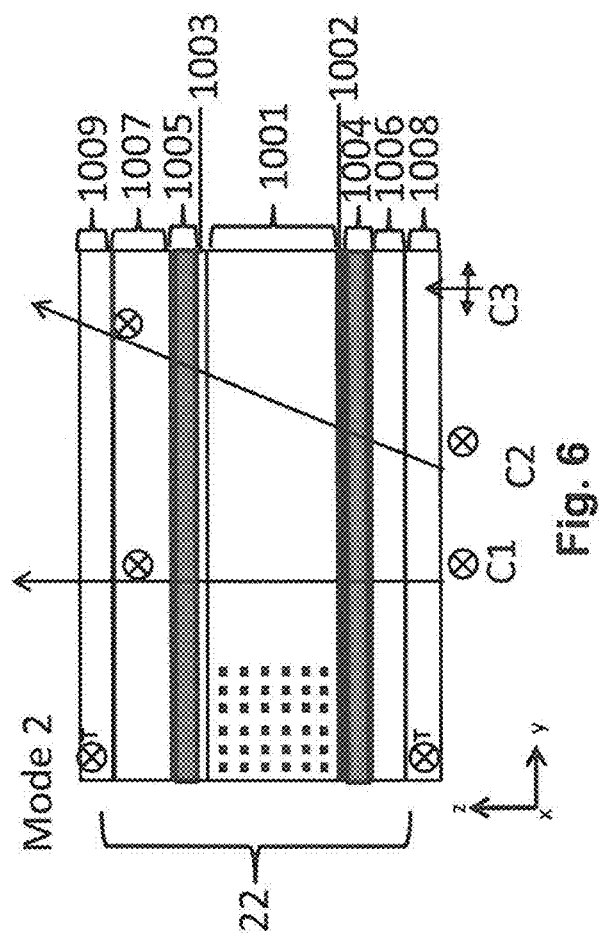

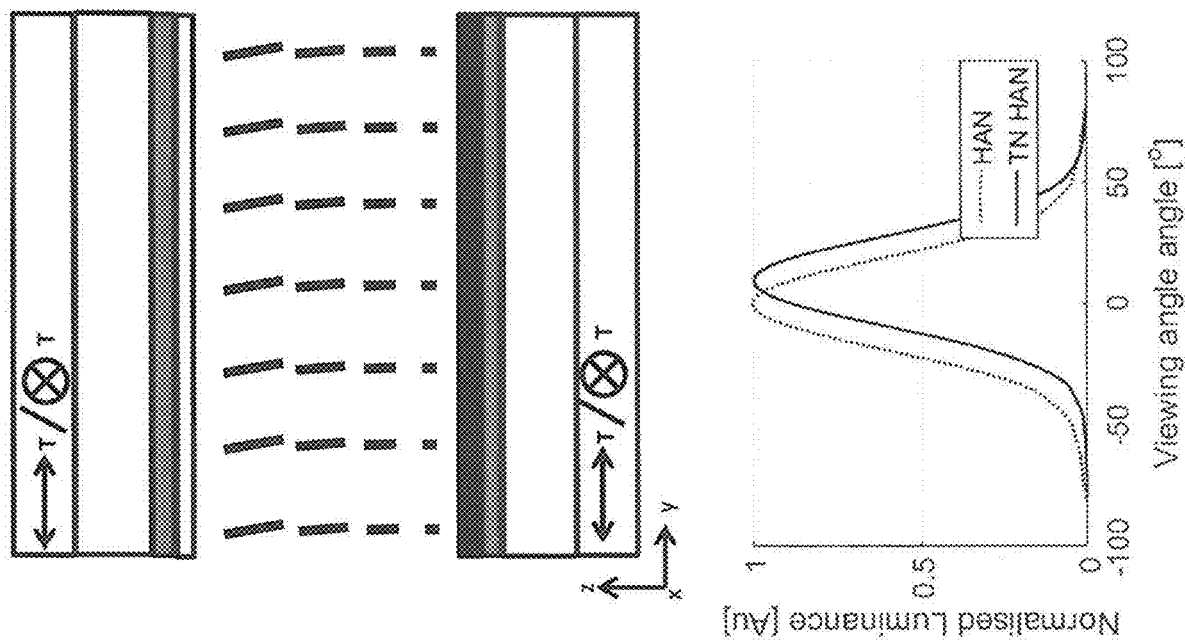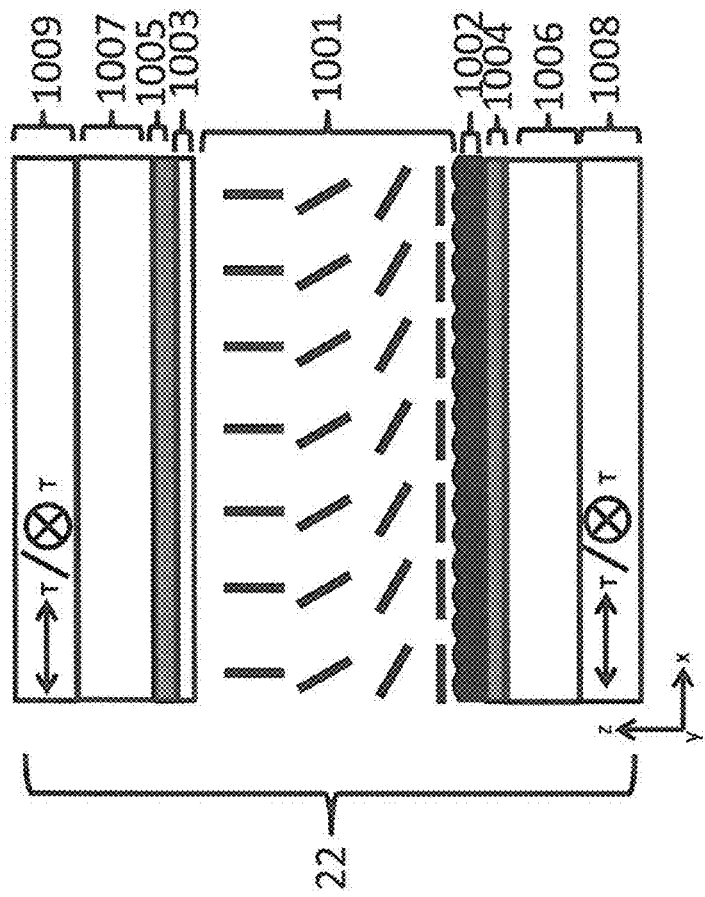
Fig. 20

| | Alignment layers | | Wide angle view mode | Narrow angle view modes | | | |
|---|---|---|---|---|---|---|---|
| | Alignment layer 1 | Alignment layer 2 | | NVM 1 | NVM 2 | NVM 3 | NVM 4 |
| Configuration 1 | Bistable | Monostable [planar] | ECB | HAN | HAN + $V_{bias}$ | ECB + $V_{bias}$ | N/A |
| Configuration 2 | Bistable | Monostable [vertical] | VAN + compensation | HAN | HAN + $V_{bias}$ | N/A | N/A |
| Configuration 3 | Bistable 1 | Bistable 2 | ECB | HAN | HAN + $V_{bias}$ | ECB + $V_{bias}$ | VAN |
| Configuration 4 | Bistable 1 | Bistable 2 | VAN + compensation | HAN | HAN + $V_{bias}$ | ECB | ECB + $V_{bias}$ |

Fig. 21

BISTABLE SWITCHABLE LIQUID CRYSTAL PRIVATE DEVICE

TECHNICAL FIELD

The present invention relates to liquid crystal display devices, and more specifically to liquid crystal display devices that are switchable between a narrow angle view mode (also referred to as a private mode) and a wide angle view mode (also referred to as a public mode).

BACKGROUND ART

With the increased use of portable computing devices having liquid crystal displays (LCDs), such as smartphones, laptop computers, tablet computers and the like, users have become concerned with other individuals being able to read sensitive or private information. Accordingly, many portable computing devices are operable in a narrow angle view mode (also referred to as a private mode) in which information is largely viewable only by an on-axis viewer, and a separate wide angle view mode (also referred to as a public mode) in which information is generally viewable at wider viewing angles by off-axis viewers within the capabilities of the device. Such devices typically are switchable between the narrow angle view mode and the wide angle view mode. For example, US 2002/0158967 (Janick et al., published Oct. 31, 2002) describes the use of a light control film mounted on a display so that the light control film can be moved over the front of the display to give a private mode, or mechanically retracted into a holder behind or beside the display to give a public mode.

Electronic switching methods have been developed to avoid the need for moving parts such as described above, which may be unsuitable within the size constraints of portable computing devices. One method of switching between the public and private modes with no moving parts is to mount a light control film behind the image display panel relative to the viewing side of the device, and to place a diffuser that can be electronically switched on and off between the light control film and the image display panel. Switchable privacy devices of this type are described, for example, in U.S. Pat. No. 5,831,698 (Depp et al., issued Nov. 3, 1998), U.S. Pat. No. 6,211,930 (Sautter et al., issued Apr. 3, 2001), and U.S. Pat. No. 5,877,829 (Okamoto et al., issued Mar. 2, 1999).

Other electronically switchable displays are described in the following. U.S. Pat. No. 5,825,436 (Knight, issued Oct. 20, 1998) describes a light control device that is similar in structure to a louver film. However, each opaque element in the louver film is replaced by a liquid crystal cell that can be electronically switched from an opaque state to a transparent state. Another method for producing a switchable public/private display device is disclosed in JP 3607272 (Takato et al., issued Jan. 5, 2002). GB 2405544 (Evans et al., published Mar. 2, 2005) and JP 2005-078093 (Evans et al., published Mar. 24, 2005) describe switchable privacy devices based on louvers, which operate only for one polarization of light. US 2005/0243265 (Winlow et al., published Nov. 3, 2005) describes a switchable privacy device that is constructed by adding one or more extra liquid crystal layers and polarizers to a display panel. The intrinsic viewing angle dependence of these extra elements can be changed by electrically switching the liquid crystal. U.S. Pat. No. 8,698,718 (Gass et al., issued Mar. 8, 2002) describes various methods of achieving a switchable privacy function.

U.S. Pat. No. 6,249,332 (Bryan-Brown et al., issued Jun. 19, 2001) and U.S. Pat. No. 7,019,795 (Jones, issued Jul. 24, 2004) describe a zenithal bistable liquid crystal display (ZBD). The ZBD has a monostable surface and a bistable surface, and therefore the ZBD has two energetically stable configurations of the liquid crystal molecules. Power is only required to switch from the first energetically stable state to the second energetically stable state. Consequently, a bistable LCD can be passively addressed with a first image, and power is only required to display a second image that is different from the first image.

US 2013/0342512 (Smith et al., published Dec. 26, 2015) and US 2015/0042704 (Smith et al., published Feb. 12, 2015) describe display systems that include an image panel and a ZBD panel. These display systems may be switchable between a wide angle view mode and narrow angle view mode. The ZBD panel performs the view angle control function for the image panel. The ZBD has a monostable LC alignment surface and a bistable LC alignment surface. The monostable LC alignment surface is patterned and the bistable LC alignment surface is patterned. When these display systems are in a narrow angle view mode, the LC in the ZBD forms a 90° twisted structure. The narrow angle view mode restricts viewing from one off-axis viewing direction only.

SUMMARY OF INVENTION

The present disclosure describes a display system that is electrically switchable between a narrow angle view mode (also referred to as a private mode) and a wide angle view mode (also referred to as a public mode). With the described configurations, a display device operates in different states that enable both enhanced screening of off-axis light of the private mode, and wider distribution of light for the public mode.

Current approaches to achieving strong off-axis light control, such as described in the background section above, do so at the cost of resolution and/or brightness. Furthermore, conventional configurations may require the inclusion of an additional optical layer, for example a switchable scattering layer or an additional light guide, to enable a wide angle view mode. The inclusion of these additional optical layers reduces off-axis light control as the layers commonly scatter light.

Embodiments of the disclosed display system include a backlight unit, a liquid crystal display (LCD) image panel and a switchable zenithal bistable liquid crystal display (ZBD) view angle control LCD. An emissive image display alternatively may be employed instead of the backlight unit/LCD image panel combination. Two or more of any of the aforementioned layers may be adhered together to prevent the formation of air gaps and limit interlayer reflections. The switchable ZBD view angle control LCD is a switchable LCD that can be electrically switched between two states. A first state corresponds to a narrow angle view mode in which at least a portion of off-axis light essentially is not transmitted. A second state corresponds to a wide angle view mode in which off-axis light may be transmitted for a wide viewing angle. The backlight unit when present may be a conventional backlight unit, a collimated backlight unit, a switchable backlight unit (between wide view and collimated), or a conventional backlight unit in addition to a view angle control film. In addition, the backlight unit may be an active dimming type backlight.

An aspect of the invention, therefore, is a switchable view angle control device that provides an enhanced private mode while maintaining a high quality public mode as compared to conventional configurations. In exemplary embodiments, the switchable view angle control device includes an electrically switchable zenithal bistable liquid crystal display view angle control liquid crystal device (ZBD view angle control LCD) that is operable in a first state and a second state; a front polarizer located on a viewing side of the switchable ZBD view angle control LCD; and a polarized light source located on a non-viewing side of the switchable ZBD view angle control LCD that emits light that is polarized in a first direction. When the switchable ZBD view angle control LCD in the first state, the view angle control device operates in a narrow angle view mode in which the polarization of the light from the polarized light source is changed by the switchable ZBD view angle control LCD to be polarized in a second direction that is at least partially absorbed by the front polarizer, and on-axis light passes through the switchable ZBD view angle control LCD and the front polarizer. When the switchable ZBD view angle control LCD is in the second state, the view angle control device operates in a wide angle view mode in which the polarization state of the light from the polarized light source is not changed by the switchable ZBD view angle control LCD and passes through the front polarizer.

The ZBD view angle control LCD may include a first electrode substrate; a bistable alignment layer deposited on the first electrode substrate; a second electrode substrate; a second alignment layer deposited on the second electrode substrate; and a liquid crystal layer positioned between the bistable alignment layer and the second alignment layer. The ZBD view angle control LCD further may include a first polarizer located on the first electrode substrate opposite from the bistable alignment layer, and a second polarizer located on the second electrode substrate opposite from the second alignment layer, wherein the first and second polarizers have a same transmission axis direction. The transmission axis of the first and second polarizers may be either parallel to or perpendicular to the planar orientation of the liquid crystal alignment at the bistable alignment layer. The second alignment layer may be a monostable planar alignment layer, a monostable vertical alignment layer, or another bistable alignment layer.

Another aspect of the invention is a display system that includes an enhanced switchable ZBD view angle control device in combination with an image panel. The image panel may be a liquid crystal image panel, and the display system further includes a backlight located on a non-viewing side of the display system relative to the liquid crystal image panel. Alternatively, the image panel may be an emissive image panel located on a non-viewing side of the ZBD view angle control LCD.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 1a is a schematic drawing depicting a non-switchable narrow view liquid crystal display (LCD) configuration as is conventional in the art.

FIG. 1b is a schematic drawing depicting a switchable view angle liquid crystal display (LCD) configuration as is conventional in the art.

FIG. 2 is a schematic drawing depicting an exemplary LCD device configuration in accordance with embodiments of the present invention.

FIG. 4 is a schematic drawing depicting an exemplary configuration and operation of a switchable ZBD view angle control LCD in accordance with embodiments of the present invention.

FIG. 5 is a schematic drawing depicting an exemplary switchable ZBD view angle control LCD in accordance with embodiments of the present invention, including optical performance in a narrow view angle mode.

FIG. 6 is a schematic drawing depicting the exemplary switchable ZBD view angle control LCD of FIG. 5 and showing optical performance in a wide view angle mode.

FIG. 20 is a drawing depicting an asymmetric view angle control in accordance with embodiments of the present invention.

FIG. 21 is a chart depicting a summary of exemplary configurations and associated view angle modes that are achievable using the ZBD view angle control LCD in accordance with embodiments of the present invention.

DESCRIPTION OF EMBODIMENTS

Figure 3:
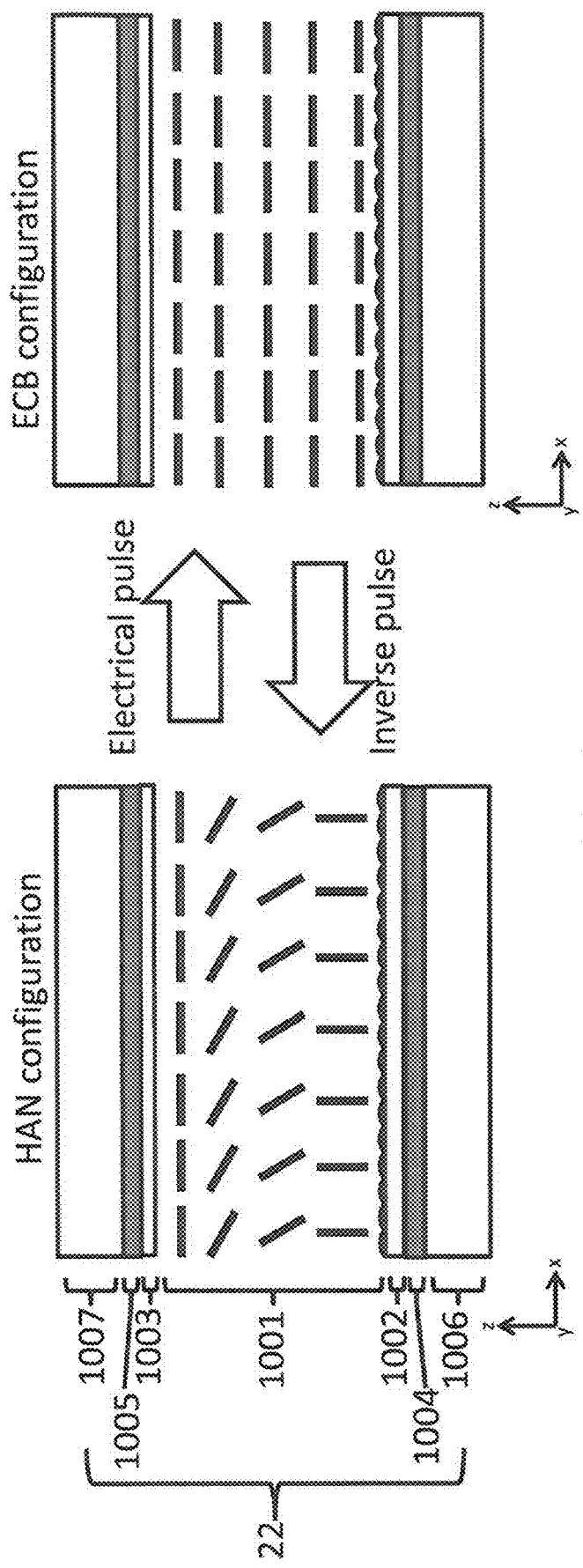
FIG. 3 is a schematic drawing depicting an exemplary configuration of a ZBD device to illustrate ZBD functionality.

Embodiments of the present invention will now be described with reference to the drawings, wherein like reference numerals are used to refer to like elements throughout. It will be understood that the figures are not necessarily to scale.

In the context of the layering of the components of device configurations described herein, the viewing side, sometimes also referred to as the outer side of the LCD or associated display system, is the side at which a person typically would look at or view images on the LCD, from which images may be provided for projection, and the like. Relative to the illustrations in the drawings, the top or upper side of the device configuration, or of a component or layer of the device configuration, is at the top of the respective drawings, i.e., is closer to the viewing side. The side opposite to the viewing side is referred to as the non-viewing side, bottom, lower, or back side, or in some cases the backlight-side of the LCD or display system.

FIG. 1a is a schematic drawing depicting a non-switchable narrow view angle liquid crystal device (LCD) configuration 10a as is conventional in the art. FIG. 1b is a schematic drawing depicting a switchable view angle liquid crystal device (LCD) configuration 10b with both narrow view and wide view modes as is conventional in the art. FIG. 2 is a schematic drawing depicting an LCD configuration 20 in accordance with embodiments of the present invention.

In the conventional configuration 10a, a backlight 12 emits light 14 to a view angle control film 16, and the light subsequently illuminates a liquid crystal display (LCD) image panel 18. The view angle control film may be a louver film as are known in the art. The arrows schematically illustrating the light beams 14 illustrate that the view angle control film 16 gives a good narrow view state.

In the conventional configuration 10b, a backlight 12 emits light 14 to a view angle control film 16, which passes into a switchable scattering device 33, the light then subsequently illuminates a liquid crystal display (LCD) image panel 18. The view angle control film may be a louver film as are known in the art. The switchable scattering device may be a polymer dispersed liquid crystal as is known in the art. This configuration has two states, a narrow view mode (mode 1) and a wide view mode (mode 2). These states are dependent on whether the switchable scattering device is in the scattering mode or transmissive mode. The arrows schematically illustrating the light beams 14 illustrate that the view angle control film 16 gives a good narrow view state. In mode 2 the switchable scattering device is in a scattering state leading to a wide view mode. In mode 1 the switchable scattering device is in a transmissive state leading to a narrow view mode. A limitation of this configuration is also illustrated by the arrows, specifically that in mode 1 the switchable scatter still scatters a small proportion of the light into the off axis states due to an imperfect transmissive state.

An aspect of the invention, therefore, is a display system that includes an enhanced switchable view angle control device to provide a strong private mode while maintaining a high-quality public mode. In exemplary embodiments, the display system includes an electrically switchable ZBD view angle control liquid crystal device (LCD) that is operable in a first state and a second state, and an image panel. When the switchable ZBD view angle control LCD is in the first state, the display system operates in a narrow angle view mode in which at least a portion of off-axis light is blocked and on-axis light passes through the switchable view angle control LCD to be emitted by the display system. When the switchable ZBD view angle control LCD is in the second state, the display system operates in a state such that off-axis light is not blocked giving a wide view mode.

Referring to the figures, in the LCD device 20 of FIG. 2 in accordance with embodiments of the present invention, an additional switchable zenithal bistable liquid crystal display (ZBD) view angle control LCD 22 is incorporated into the device. The switchable ZBD view angle control LCD 22 may be a bistable type LCD that can be electrically switched between a first mode (Mode 1 in FIG. 2) and a second mode (Mode 2 in FIG. 2). In the first mode (Mode 1), the switchable ZBD view angle control LCD 22 performs a view angle restriction function to provide a narrow angle viewing or private mode. In the second mode (Mode 2), the switchable ZBD view angle control LCD 22 operates in a manner as to not block off axis light. This configuration has advantages over the conventional designs 10a, and 10b. This configuration is advantages over configuration 10a as it has both wide and narrow view modes. Configuration 20 is advantages over configuration 10b in three principle ways. Firstly the wide view and narrow view modes are performed by a single layer in configuration 20 in contrast to the two layers required in configuration 10b. Secondly the absence of a scattering layer in configuration 20 means there is no reduction in the quality of the narrow view mode (mode 1), unlike configuration 10b where the switchable scattering device deteriorates the performance in the narrow view mode. Finally the wide view mode in configuration 10b is substantially darker than the wide view mode of configuration 20. This is because the wide view in configuration 10b is obtained by redistributing the residual on-axis light into higher angles, whereas in the wide view mode of configuration 20 the light is simply not absorbed.

Two or more of any of the aforementioned layers may be adhered together to prevent the formation of air gaps and limit interlayer reflections. In accordance with Mode 1 and Mode 2 above, therefore, the switchable ZBD view angle control LCD 22 may be a bistable switchable LCD that can be electrically switched between two states. A first state corresponds to a narrow angle view mode in which a portion of off-axis light essentially is not transmitted. A second state corresponds to a wide angle view mode in which off-axis light may be transmitted for a wider viewing angle. The backlight unit 12 may be a conventional backlight unit, a collimated backlight unit, a switchable backlight unit (between wide view and collimated), or a conventional backlight unit in addition to a view angle control film. In addition, the backlight unit may be an active dimming type backlight. The LCD image panel 18 may be any conventional LCD image panel containing pixels and that is capable of displaying pictures and text in a conventional fashion.

FIG. 3 is a schematic drawing depicting an exemplary configuration of a ZBD device, such as a ZBD view angle control LCD 22, to illustrate ZBD functionality. Directional axes are indicated to further illustrate associated alignment directions. In this example, the ZBD view angle control LCD 22 includes a bistable alignment layer 1002, which is switchable between two stable director configurations of liquid crystal molecules within a liquid crystal cell or LC layer 1001. The bistable alignment layer 1002 also is referred to as a ZBD alignment layer 1002, which has a grating structure of a known type typically used in ZBD type devices. The bistable alignment layer 1002 has two stable liquid crystal alignment states, including a vertically aligned state as illustrated in the left portion of FIG. 3 (i.e., LC molecules are oriented vertically at the layer 1002), and a planar aligned state as illustrated in the right portion of FIG. 3 (i.e., LC molecules are oriented planarly at the layer 1002). On the opposing side of the LC layer 1001 is a monostable alignment layer 1003, which is a planar alignment layer in this example. In the disclosed configuration, both the bistable alignment layer 1002 and the monostable alignment layer 1003 have homogeneous alignment directions, i.e., neither alignment layer is patterned in a manner as to induce a non-homogeneous alignment direction at the surface of the respective alignment layers.

The ZBD view angle control LCD 22 may be switched between the vertically and horizontally aligned states using a dipolar electric pulse and associated inverse pulse. Specifically, the voltage pulse may be a bipolar square pulse, the amplitude of which should have an amplitude greater than a threshold value $V_{threshold}$ to switch the ZBD alignment layer (i.e. $V_{pulse} > V_{threshold}$), and the duration of which is denoted $t_{zbd}$. The specific amplitude is a function of many variables including $t_{zbd}$ as is known in the ZBD art. The electric field of this pulse is applied between two layers, specifically between a first electrode layer 1004 and second electrode layer 1005. The first and second electrode layers respectively may be deposited on a first electrode substrate 1006 and a second electrode substrate 1007. It may be beneficial to apply a bias voltage ($V_{bias}$) to the ZBD view angle control LCD 22 for enhanced control of the switching between states. This bias voltage may be an AC voltage or a DC voltage. In general, $V_{bias} < V_{threshold}$, but so long as $V_{bias}$ is; a non-square wave or a square wave were the time period is not close to $t_{zbd}$ or a square wave where the time period is close to $t_{zbd}$ but $V_{bias} < V_{threshold}$, the bias voltage should not induce a bistable LC switch.

As described above, in this specific example the ZBD view angle control LCD 22 includes a bistable type alignment layer 1002 and a monostable type alignment layer 1003 being a planar type alignment layer. With such configuration, the ZBD bistability enables the device to be in one of two director configurations. With the illustrated configuration, the left side portion of FIG. 3 corresponds to a hybrid aligned nematic state (HAN configuration) in which the alignment is planar at the monostable surface 1003 and vertical at the switchable ZBD layer 1002. The right side portion of FIG. 3 illustrates an electrically controlled birefringence state (ECB configuration) in which the alignment at the switchable ZBD layer 1002 is planar comparably as the monostable layer 1003. Typically, the wide angle view mode (public mode) is an ECB mode, and in exemplary embodiments the wide angle view mode alternatively may be a vertically aligned nematic (VAN) state in which the switchable ZBD layer 1002 and the monostable layer 1003 have a vertical alignment direction. In subsequent embodiments, when the ZBD view angle control LCD 22 is in the HAN configuration, a narrow angle viewing mode (private mode) is enabled.

An aspect of the invention, therefore, is a switchable view angle control device that provides an enhanced private mode while maintaining a high quality public mode as compared to conventional configurations. In exemplary embodiments, the switchable view angle control device includes an electrically switchable zenithal bistable liquid crystal display view angle control liquid crystal device (ZBD view angle control LCD) that is operable in a first state and a second state; a front polarizer located on a viewing side of the switchable ZBD view angle control LCD; and a polarized light source located on a non-viewing side of the switchable ZBD view angle control LCD that emits light that is polarized in a first direction. When the switchable ZBD view angle control LCD in the first state, the view angle control device operates in a narrow angle view mode in which the polarization of off-axis light from the polarized light source is changed by the switchable ZBD view angle control LCD to be polarized in a second direction so that it is at least partially absorbed by the front polarizer, while on-axis light passes through the switchable ZBD view angle control LCD and the front polarizer. When the switchable ZBD view angle control LCD is in the second state, the view angle control device operates in a wide angle view mode in which the polarization state of the off-axis polarized light from the polarized light source is unchanged by the switchable ZBD view angle control LCD and passes through the front polarizer.

FIG. 4 is a schematic drawing depicting an exemplary configuration of a switchable ZBD view angle control LCD 22 in accordance with embodiments of the present invention. In this example, similarly as above a liquid crystal cell includes a planar type monostable alignment layer 1003 and a bistable type alignment layer 1002, on opposing sides of an LC layer 1001. The bistable alignment layer and planar alignment layer respectively are deposited on a first electrode 1004 and a second electrode 1005, which in turn respectively are deposited respective on a first electrode substrate 1006 and a second electrode substrate 1007. Alternatively, the bistable alignment layer and planar alignment layer respectively are deposited on a second electrode 1005 and a first electrode 1004, which in turn respectively are deposited respective on a first electrode substrate 1006 and a second electrode substrate 1007. In other words, the bistable alignment layer 1002 may be deposited on either the substrate that is closest to the viewer (substrate 1007) or the substrate that is furthest from the viewer (substrate 1006) while the monstable alignment layer is deposited on the substrates that is opposite the substrate upon which the bistable alignment layer 1002 is deposited. The ZBD view angle control LCD 22 further includes a back or first polarizer 1008 located on a non-viewing side of the device (i.e., on the first electrode substrate 1006), and a front or second polarizer 1009 located on a viewing side of the device (i.e., on the second electrode substrate 1007).

In this example, the bistable type alignment layer 1002 is an alignment layer that has at least two stable LC alignment states, specifically a stable planar aligned LC state and a stable vertical aligned LC state as shown in FIG. 3. FIG. 4 illustrates two different optical orientations of the polarizer layers relative to LC surface alignment. In FIG. 4 the bistable type alignment layer 1002 is shown promoting planar alignment but may be switched to vertical alignment. In the left portion of FIG. 4, a transmission axis of the back and front polarizers 1008 and 1009 is parallel to the planar orientation of the liquid crystal alignment at the ZBD type alignment layer 1002, which is referred to as the E-mode. In the right portion of FIG. 4, the transmission axis of the back and front polarizers 1008 and 1009 is perpendicular to the planar orientation of the liquid crystal alignment at the ZBD type alignment layer 1002, which is referred to as the O-mode. The polarizers may be in either the E-mode configuration or the O-mode configuration. The O-mode configuration of polarizers may be preferred to minimize diffraction from the ZBD grating alignment layer/LC interface (i.e., the boundary between layers 1002 and 1001) due to the differences of refractive index at the boundary.

The ZBD view angle control LCD 22 may have a varied configuration relative to the example of FIGS. 3 and 4. In another exemplary embodiment, the ZBD type alignment layer 1002 is on the viewing side relative to the LC layer 1001, with the monostable alignment layer 1003 being on the non-viewing side relative to the LC layer 1001. One of these configurations may be preferable to minimize diffraction effects from the ZBD grating. In another exemplary embodiment, the polarizers are in-cell type polarizers, this may be preferable in order to minimize the thickness of the device. In another exemplary embodiment, the monostable alignment layer 1003 is a photoalignment type layer, or the monostable alignment layer 1003 may be a rubbed type layer, a rubbed type alignment layer may be preferable due to higher pretilt, a photoalignment type layer may be preferable due to low pretilt. The view angle control (i.e. privacy strength) of the hybrid alignment state (HAN) can be improved by application of a bias voltage $V_{bias}$ in the range 0.5 V to 10 V. The magnitude of this $V_{bias}$ is dependent on the material properties of the liquid crystals. In the embodiment of FIG. 4, the monostable alignment layer 1003 is a planar type alignment layer. While this configuration may be preferable, the ZBD view angle control LCD 22 can also be constructed with the monostable alignment layer that is a vertical type alignment layer. A planar type alignment layer may give an improved wide view mode, a vertical type alignment layer may help suppress multiple domains.

The retardance (dΔn) may be between 250 nm and 25 μm, preferably between 2500 nm and 12.5 μm, and more preferably between 5000 nm and 10 μm. The retardation for a ZBD used in conventional applications is generally <1000 nm, and more typically <700 nm. Accordingly, the retardation for a ZBD used in embodiments of the present invention is considerably larger than for conventional ZBD applications.

The following describes the optical performance of the switchable ZBD view angle control LCD 22, both in narrow and wide angle viewing modes. Referring to the figures, FIG. 5 is a schematic drawing depicting an exemplary switchable ZBD view angle control LCD 22 in accordance with embodiments of the present invention, including optical performance in a narrow view angle mode. FIG. 6 is a schematic drawing depicting the exemplary switchable ZBD view angle control LCD 22 of FIG. 5 and showing optical performance in a wide view angle mode. In this example, the ZBD view angle control LCD 22 has a configuration as illustrated in FIG. 4.

Referring to FIG. 5 and Mode 1 (narrow angle view), the ZBD view angle control LCD 22 is in the first state corresponding to the HAN mode in which the bistable alignment layer 1002 is switched to align the LC molecules 1001 oppositely relative to the alignment at the monostable alignment layer 1003. In this example in which the monostable alignment layer 1003 is a planar alignment layer, in Mode 1 the alignment at the bistable alignment layer 1002 is vertical. In this first state, the polarization of the off-axis light is rotated by the LC layer 1001, and then is absorbed by the front polarizer 1009 so that the off-axis light substantially is not emitted from the viewing side of the device. The change of polarization of the off-axis light is achieved by the hybrid aligned liquid crystal state, in which the alignment at one alignment layer is planar or substantially planar (LC pretilt<15°) while the alignment of the other alignment layer is vertical or substantially vertical (LC pretilt>80°).

As illustrated in FIG. 5, exemplary polarized light beams C1, C2, and C3 are emitted from the non-viewing side components comprising a polarized light source. The polarized light source may have variety of configurations as described with respect to FIG. 2 and FIGS. 8-10 below. For example, the polarized light source include a polarizing backlight, a backlight combined with a polarizing LCD image panel, an emissive image panel combined with a polarizer, and suitable configurations combining a light source and any associated polarizers to generate polarized light. The light beams C1 and C2 are polarized in a first direction, and light beam C3 is polarized in a second direction different from the first direction. Light beams C1 and C3 are on-axis beams, and light beam C2 is an off-axis beam. With the indicated polarizations, light polarized in the second direction (C3) is undesirably polarized light and thus is blocked by the rear (first) polarizer 1008. The light beams C1 and C2 polarized in the first direction are transmitted through the rear polarizer 1008. In Mode 1, the switchable ZBD view angle control LCD 22 is in a first state that passes the on-axis light C1 through the device stack. In contrast, the HAN state changes the polarization of the off-axis light C2 to the second polarization. With the changed polarization, off-axis light C2 is absorbed by the front (second) polarizer 1009. In this manner, the narrow angle view mode is achieved in that essentially only the on-axis light is emitted.

In Mode 2, the wide angle view mode as illustrated in FIG. 6, the ZBD view angle control LCD 22 is in the second state corresponding to the ECB mode in which the bistable alignment layer 1002 is switched to align the LC molecules 1001 in a similar fashion to the monostable alignment layer 1003. In this example in which the monostable alignment layer 1003 is a planar alignment layer, in Mode 2 the alignment at the bistable alignment layer also is planar. If both the bistable alignment layer 1002 and monostable alignment layer 1003 induce a non-zero pretilt alignment that is substantially planar, then the bistable alignment layer 1002 and monostable alignment layer 1003 are arranged so that the alignment directions are anti-parallel. Said anti-parallel LC alignment is well known by those skilled in the art of LC for the avoidance of unwanted LC domains. In this second state, polarization of the off-axis light C2 is not changed, and thus off-axis light also is not absorbed by the front polarizer 1009. The non-hybrid aligned nematic state (ECB) may be a planar aligned nematic state as shown in FIG. 6, or alternatively may be a vertically aligned nematic (VAN) state. By emitting both the on-axis and off-axis light of the first polarization, the wide angle view mode is achieved.

Figure 7:
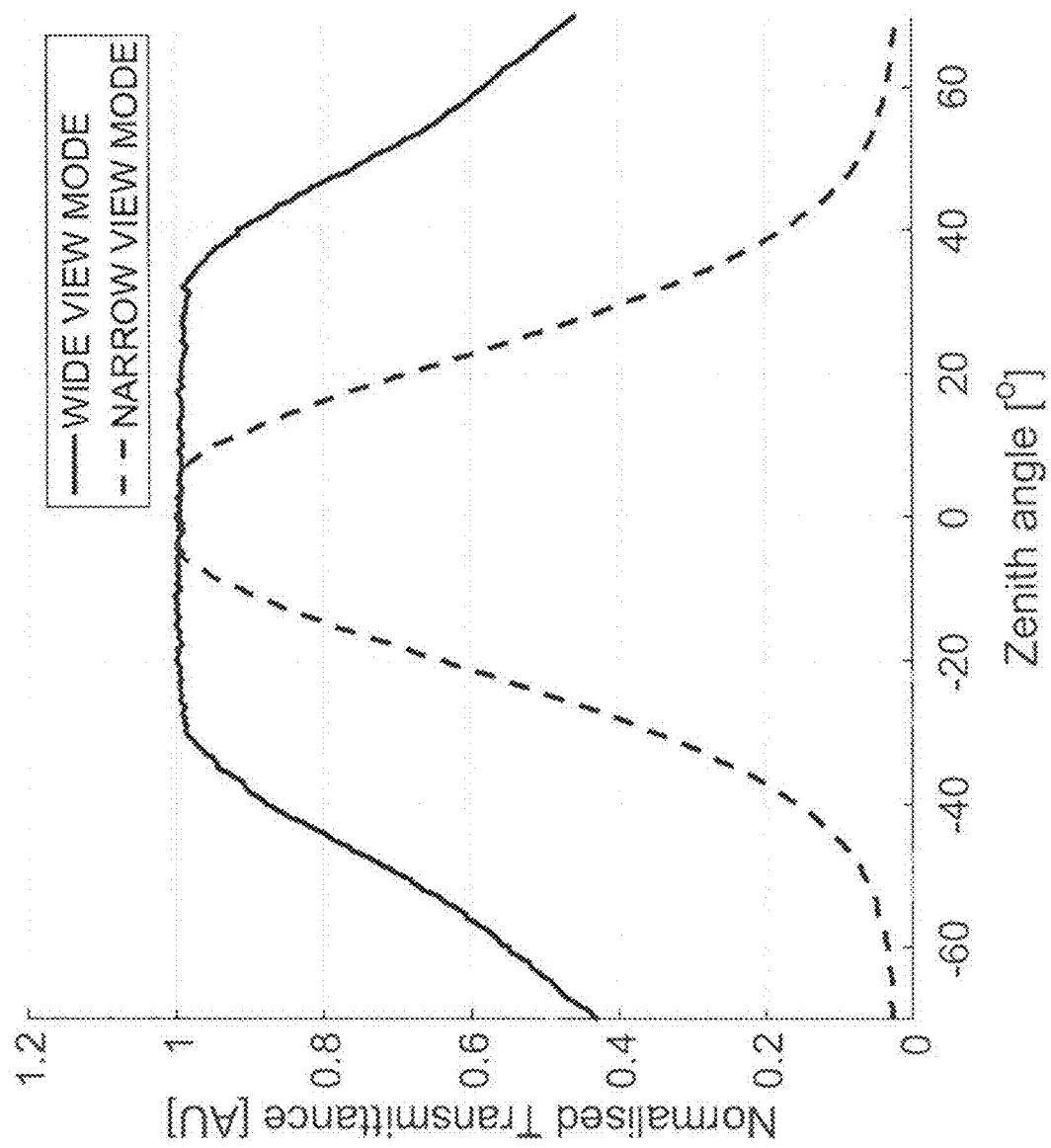
FIG. 7 includes graphs depicting a comparison of performance of a narrow angle view mode and a wide angle view mode utilizing the switchable ZBD view angle control LCD.

FIG. 7 includes graphs depicting a comparison of performance of the narrow angle view mode and the wide angle view mode utilizing the switchable ZBD view angle control LCD 22. The transmittance is plotted as a function of the viewing angle (Zenith angle). The narrow angle view mode shows high transmittance limited largely to an on-axis viewing angle (e.g., plus or minus 30°), wherein the wide angle view mode has relative high transmittance across this viewing angle range. The off-axis light absorption of the narrow angle view mode can be amplified by the application of the small bias voltage referenced above. The bias voltage maybe less than 10 V, preferably less than 7.5 V, and more preferably less than 5 V. The quality of the off-axis screening may be dependent upon the optical properties of the ZBD view angle control LCD 22. Specifically, the retardance (dΔn) may be between 250 nm and 25 μm, preferably between 2500 nm and 12.5 µm, and more preferably between 5000 nm and 10 µm. The view angle control (i.e. privacy strength) of the hybrid alignment further can be improved by application of a voltage the magnitude optimized for the material properties of the liquid crystal material.

Figures 8, 9:
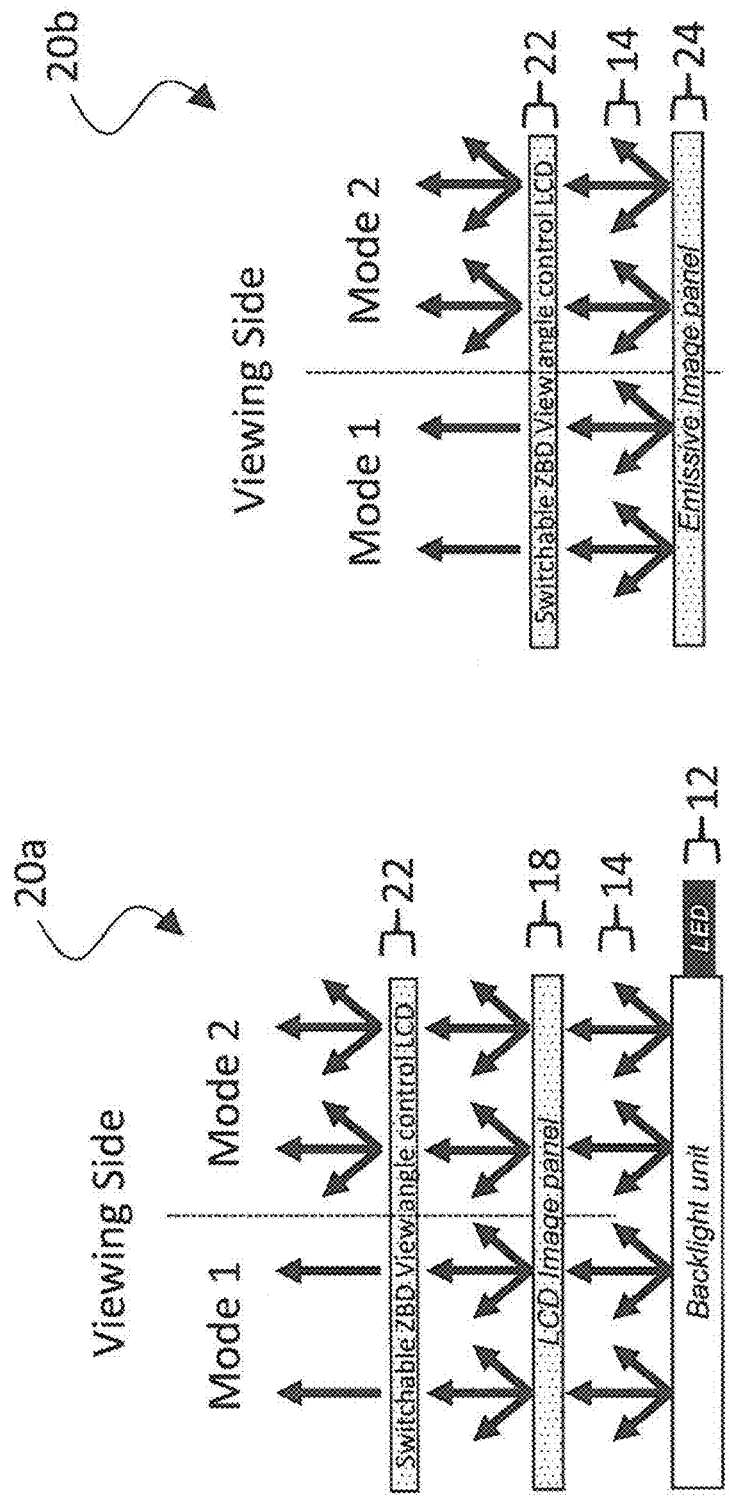
FIG. 8 is a schematic drawing depicting an LCD device configuration having comparable components as in FIG. 2, with an alternative arrangement of the components.
FIG. 9 is a schematic drawing depicting an exemplary display device configuration using an emissive image panel in accordance with embodiments of the present invention.
Figure 10:
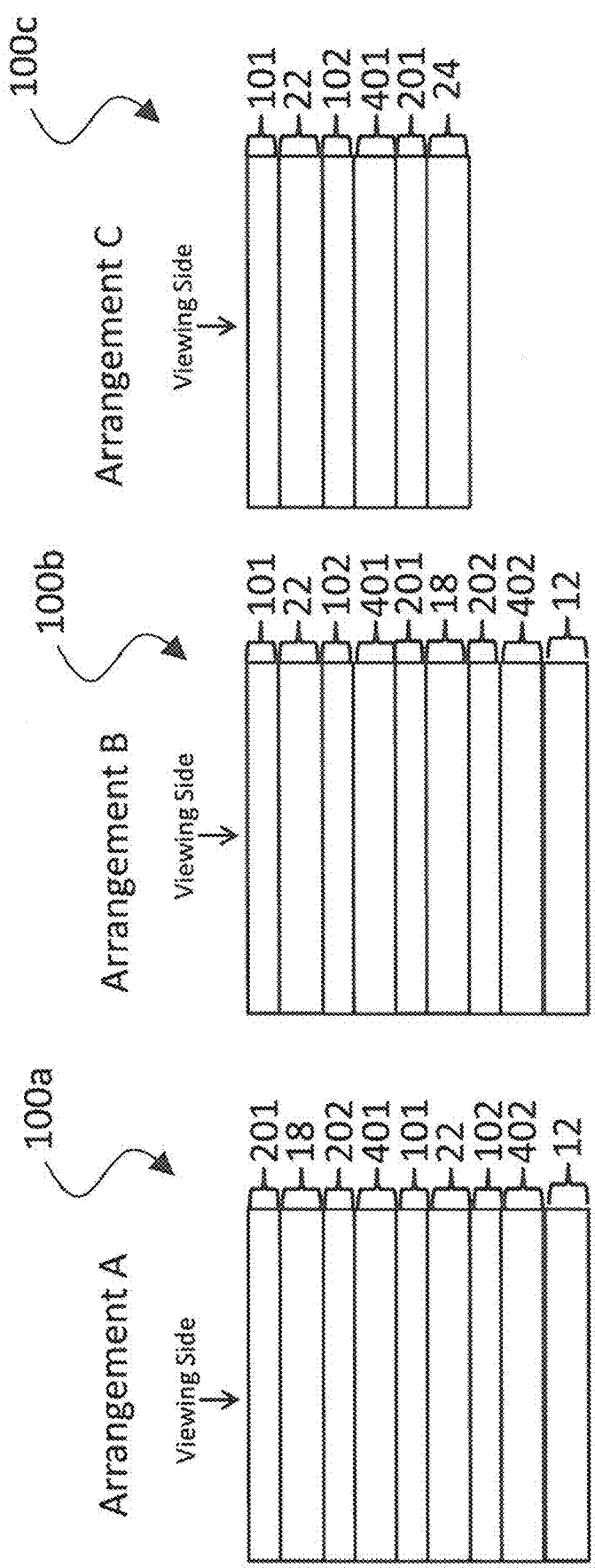
FIGS. 10A, 10B, and 10C are drawings depicting alternative arrangements of optical layers within a display system in accordance with embodiments of the present invention.

Typically, in an LCD display system incorporating the switchable ZBD view angle control LCD 22, the farthest layer from the viewing side should be the backlight unit 12 as the light source. Within such configuration, the location of the LCD image panel 18 may be placed at any suitable location. For example, FIG. 8 is a schematic drawing depicting an LCD device configuration 20*a* having comparable components as in FIG. 2, with an alternative arrangement or ordering of the components. Both Mode 1 (narrow angle view mode) and Mode 2 (wide angle view mode) also are shown in this figure. In the embodiment of FIG. 8, the components are ordered from the viewing side: switchable ZBD view angle control LCD 22, LCD image panel 18, and backlight unit 12.

In the previous embodiments, an LCD image panel is employed. In alternative embodiments, different display technologies may be employed, including for example the use of emissive image panels. For example, FIG. 9 is a schematic drawing depicting an exemplary display device configuration 20*b* using an emissive image panel 24. The emissive image panel 24, for example, may be a quantum dot light-emitting diode (QLED), micro light-emitting diode (pLED), or organic light-emitting diode (OLED) image panel. In the embodiment of FIG. 9, the switchable ZBD view angle control LCD 22 is on a viewing side relative to the emissive image panel 24. With the use of an emissive image panel, a backlight component is not required.

FIGS. 10A-10C are drawings depicting alternative arrangements of optical layers within a display system in accordance with embodiments of the present invention. In particular, specific polarizers, spacers, and like additional optical components are illustrated as positioned relative to the components described above with reference to the previous figures. Accordingly, like components are identified with like reference numerals in FIGS. 10A-10C as in the previous figures.

In the embodiment of FIG. 10A (Arrangement A), a display system 100*a* includes the components described above positioned comparably as in FIG. 2. With additional optical layers, the display system 100*a* includes the component layers ordered from the viewing side as follows: a front polarizer 201 for the LCD image panel 18, the LCD image panel 18, a rear polarizer 202 for the LCD image panel 18, a first spacer layer 401, a front polarizer 101 for the switchable ZBD view angle control LCD 22, the switchable ZBD view angle control LCD 22, a rear polarizer 102 for the switchable ZBD view angle control LCD 22, a second spacer layer 402, and the backlight unit 12. As in other embodiments, the backlight unit 12 may be a conventional backlight unit, a collimated backlight unit, a switchable backlight unit (between wide view and collimated), or a conventional backlight unit in addition to a view angle control film. In addition, the backlight unit may be an active dimming type backlight. The rear polarizer 102 for the ZBD view angle control LCD 22 may be replaced with or used in combination with a reflective type polarizer (DBEF). If present, the DBEF will be placed closest to the backlight. The spacer layers 401 and 402 may be an air gap, an adhesive layer, or a retardation layer. Any or all of the polarizers 101, 102, or 202 may be omitted due to redundancy. The polarizers 201 and 202 may be intrinsic to the LCD image panel 18.

In the embodiment of FIG. 10B (Arrangement B), a display system 100*b* includes components positioned comparably as in FIG. 8. With additional optical layers, the display system 100*b* includes the component layers ordered from the viewing side as follows: a front polarizer 101 for the switchable ZBD view angle control LCD 22, the switchable ZBD view angle control LCD 22, a rear polarizer 102 for the switchable ZBD view angle control LCD 22, a first spacer layer 401, a front polarizer 201 for the image panel LCD 18, the image panel LCD 18, a rear polarizer 202 for the image panel LCD 18, a second spacer layer 402, and the backlight unit 12. Similar to the previous embodiment, the polarizer 202 may be replaced with a reflective type polarizer (DBEF), which if present will be placed closest to the backlight. The spacer layers 401 and 402 may be an air gap, an adhesive layer, or a retardation layer. Any or all of the polarizers 201, 202, or 102 may each be omitted due to redundancy. The polarizers 201 and 202 may be intrinsic to the image panel LCD 18. As in other embodiments, the backlight unit 12 may be a conventional backlight unit, a collimated backlight unit, a switchable backlight unit (between wide view and collimated), or a conventional backlight unit in addition to a view angle control film In the embodiment of FIG. 10C (Arrangement D), a display system 100*c* includes components positioned comparably as in FIG. 9, including an emissive image panel 24. With additional optical layers, the display system 100*c* includes the component layers ordered from the viewing side as follows: a front polarizer 101 for the switchable ZBD view angle control LCD 22, the switchable ZBD view angle control LCD 22, a rear polarizer 102 for the switchable ZBD view angle control LCD 22, a first spacer layer 401, a front polarizer 201 for the emissive image panel 24, and the emissive image panel 24. As referenced above, the emissive image panel 24 may be a pLED, OLED, or QLED image panel, and the use of an emissive image panel obviates the need for a backlight component. The emissive image panel 24 may contain a polarizer and/or a retarder layer, and the polarizer may be a reflective type polarizer (DBEF), a combination of a normal polarizer and a DBEF, or a normal polarizer. The spacer layer 401 may be an air gap, an adhesive layer, or a retardation layer. Any or all of the polarizers 102 and 201 may be omitted due to redundancy.

Figure 11:
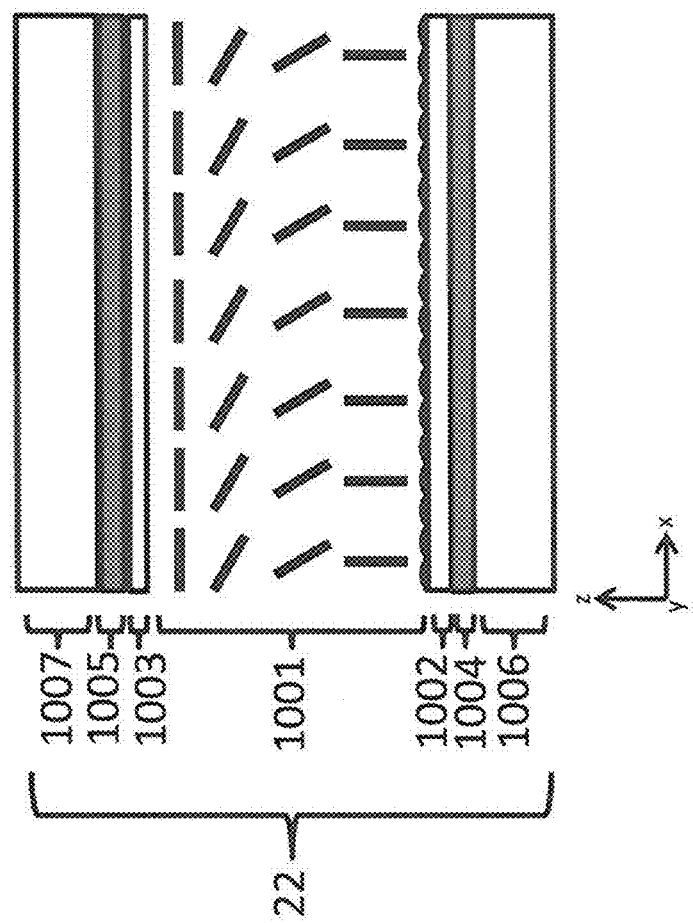
FIG. 11 is a schematic drawing depicting another exemplary ZBD view angle control LCD in accordance with embodiments of the present invention, in which polarizers are not incorporated into the ZBD view angle control LCD.

FIG. 11 is a schematic drawing depicting another exemplary view angle control LCD 22 in accordance with embodiments of the present invention, in which polarizers 1008 and 1009 from previous embodiments (see, e.g., FIGS. 4-6) are not incorporated specifically into the ZBD view angle control LCD. The remaining components are identified with like reference numerals as in the embodiments of FIGS. 4-6. The embodiment of FIG. 11 includes the two electrode substrates, each with a liquid crystal alignment layer. Between the substrates is a liquid crystal layer the optics of which is described above, and the polarizers are not part of ZBD view angle control LCD 22 stack. In this embodiment, therefore, the switchable view angle control LCD 22 may include the following components ordered from the non-viewing side as follows: a first electrode substrate 1006, a first electrode 1004, a bistable alignment layer 1002, an LC layer 1001, a monostable alignment layer 1003, a second electrode 1005, and a second electrode substrate 1007. In contrast, the configurations of FIGS. 4-6 include the additional polarizers 1008 and 1009 located on the substrates. Accordingly, in the embodiment of FIG. 11, the image panel layers or backlight have the polarizers to perform any requisite directional light modulating functions as described above.

Generally, the ZBD view angle control LCD 22 includes at least one bistable alignment layer and a second alignment layer. The previous figures illustrate embodiments in which the second alignment layer is a monostable planar alignment layer. Alternative LC alignments may be employed. For example, the second alignment layer may be a monostable vertical alignment layer, or another bistable alignment layer.

Figure 12:
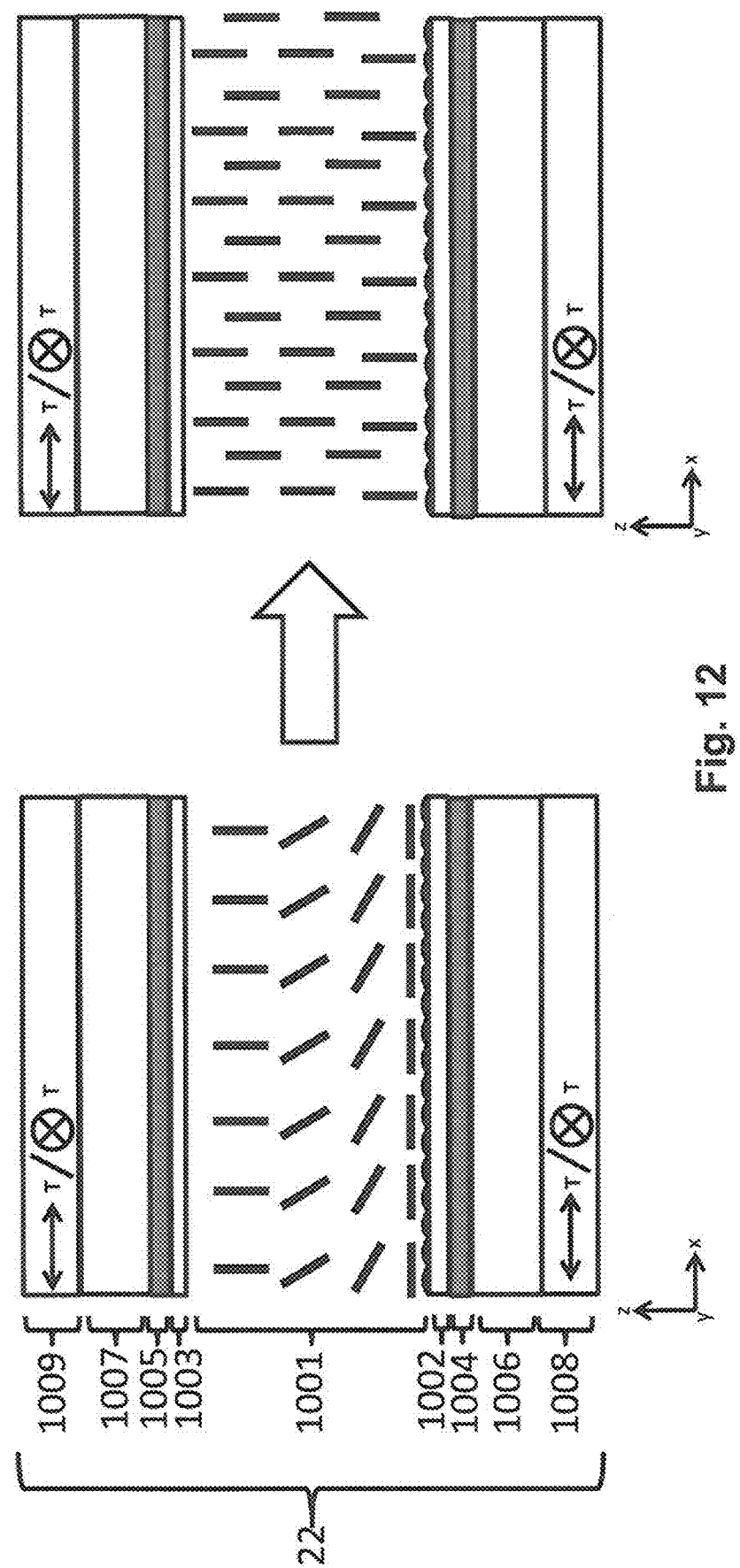
FIG. 12 is a schematic drawing depicting an exemplary configuration and operation of a switchable ZBD view angle control LCD similar to FIG. 4, and which utilizes an alternative LC alignment.

FIG. 12 is a schematic drawing depicting an exemplary configuration and operation of a switchable ZBD view angle control LCD 22 similar to FIG. 4, but which utilizes an alternative LC alignment. In particular, in this embodiment a vertically aligned nematic mode (VAN) configuration is employed for the wide view angle mode (right portion of FIG. 12). The polarizers 1008 and 1009 may be in an O-mode configuration or an E-mode configuration as described above. The O-mode configuration of polarizers may be preferred to minimize diffraction from the ZBD grating alignment layer/LC interface. As seen in this specific example, the monostable alignment layer 1003 has a vertical alignment, and in the HAN mode the bistable alignment layer 1002 is switched to a planar alignment (left portion of FIG. 12), and the ZBD view angle control LCD 22 is switchable to provide a VAN mode in which the bistable alignment layer 1002 is switched to a vertical alignment comparably as the monostable layer 1003.

Accordingly, the described configuration of ZBD view angle control LCD 22 may be used in a configuration in which the monostable type alignment layer is a planar type alignment layer, or in which the monostable type alignment layer is a vertical type alignment layer. It may be preferable for the monostable type alignment layer is a planar type alignment layer as the wide view mode may not require optical compensation films. It may also be preferable for the monostable type alignment layer to be a vertical type alignment layer as the narrow view mode may have a better performance. It also may be beneficial to apply a bias voltage ($V_{bias}$) when the VAN configuration is employed, and the bias voltage can be applied globally to the display. This may have little or no detrimental effect to the wide view mode (VAN). This bias voltage may, however, improve the narrow view mode in the hybrid aligned area as disclosed in the description of FIG. 7. If the wide angle view mode is a VAN mode, optical compensation layers may be used to improve the wide angle view mode, such as with the utilization of negative C-plate layers as optical compensation layers.

Figure 13:
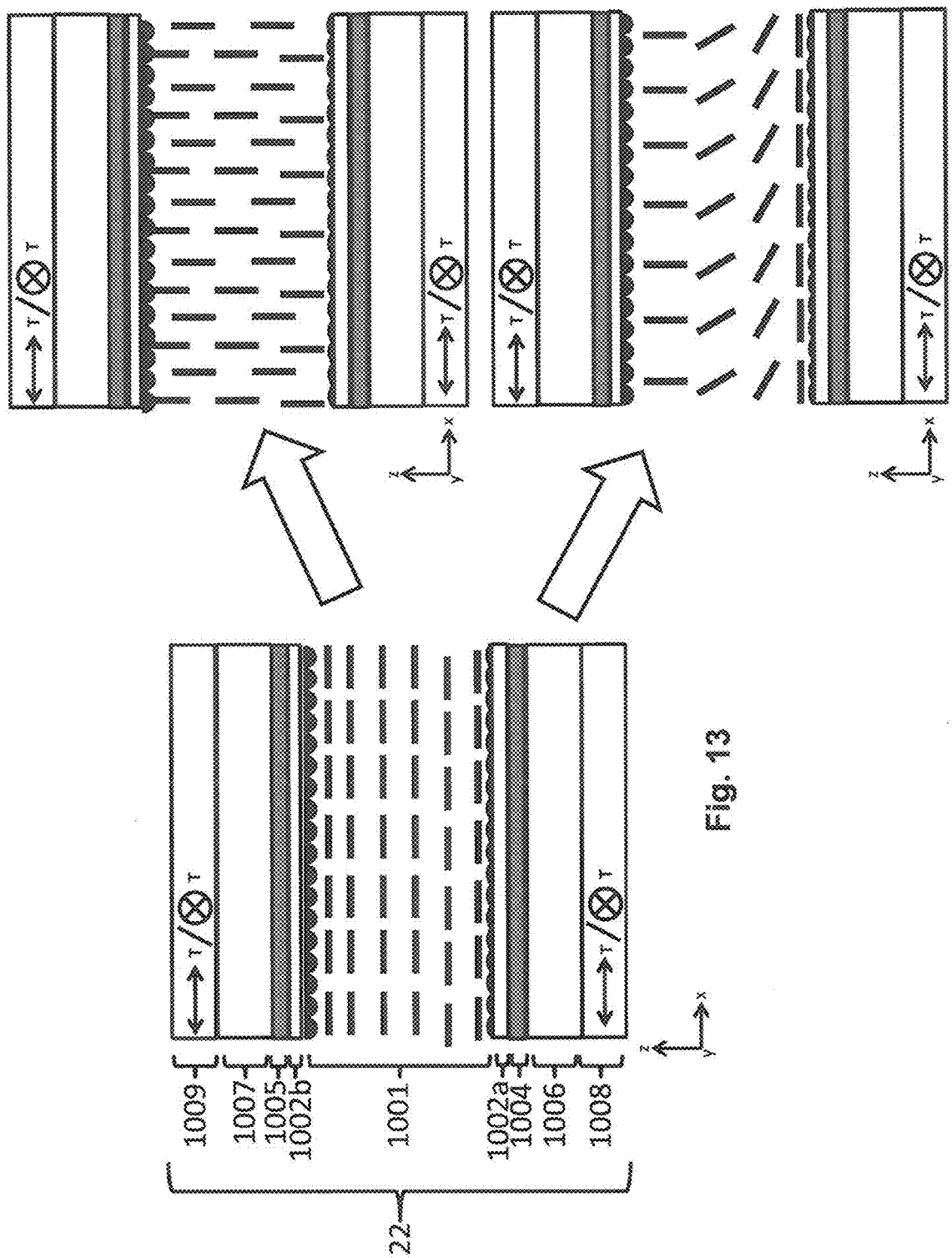
FIG. 13 is a schematic drawing depicting another exemplary configuration and operation of a switchable ZBD view angle control LCD similar to FIG. 4, and which utilizes two bistable alignment layers.

FIG. 13 is a schematic drawing depicting another exemplary configuration and operation of a switchable ZBD view angle control LCD 22 similar to FIGS. 4-6 (i.e., with polarizers 1008 and 1009), but which utilizes two bistable alignment layers. In particular, the switchable ZBD view angle control LCD 22 has a bistable type alignment layer on both the first substrate 1006 (bistable alignment layer 1002*a*) and on the second substrate 1007 (bistable alignment layer 1002*b*). Both polarizers 1008 and 1009 may be arranged to be parallel to the LC alignment when the LC is in the planar state (E-Mode) on both the first substrate 1006 and the second substrate 1007. Alternatively, both polarizers 1008 and 1009 may be arranged to be perpendicular to the LC alignment when the LC is in the planar state (O-Mode) on both the first substrate 1006 and the second substrate 1007. The O-mode configuration of polarizers may be preferred to minimize diffraction from the ZBD grating alignment layer/LC interface.

The wide angle view mode (public mode) is achieved when the LC is switched to the planar alignment configuration on both the first substrate 1006 and the second substrate 1007 and no bias voltage is applied, as shown on the left side portion of FIG. 13. As shown in the bottom right side portion of FIG. 13, a first type of narrow angle view mode (private mode) is achieved when the LC is switched to the planar alignment configuration on either the first substrate 1006 or the second substrate 1007 and the other substrate is switched to the vertical alignment condition. As shown in the top right side portion of FIG. 13, a second type of narrow angle view mode (private mode) is achieved when the LC is switched to the vertical alignment configuration on both the first substrate 1006 and the second substrate 1007. A third type of narrow angle view mode is achieved when the LC is switched to the planar alignment configuration on both the first substrate 1006 and the second substrate 1007, and a relatively small bias voltage, i.e., a voltage below the bistable switching voltage, is applied across the LC layer 1001. The first, second and third narrow angle view modes have different angular ranges and different privacy strengths. Therefore, the optimum narrow angle view mode may be selected depending upon the requirements of the viewing environment.

Figure 14:
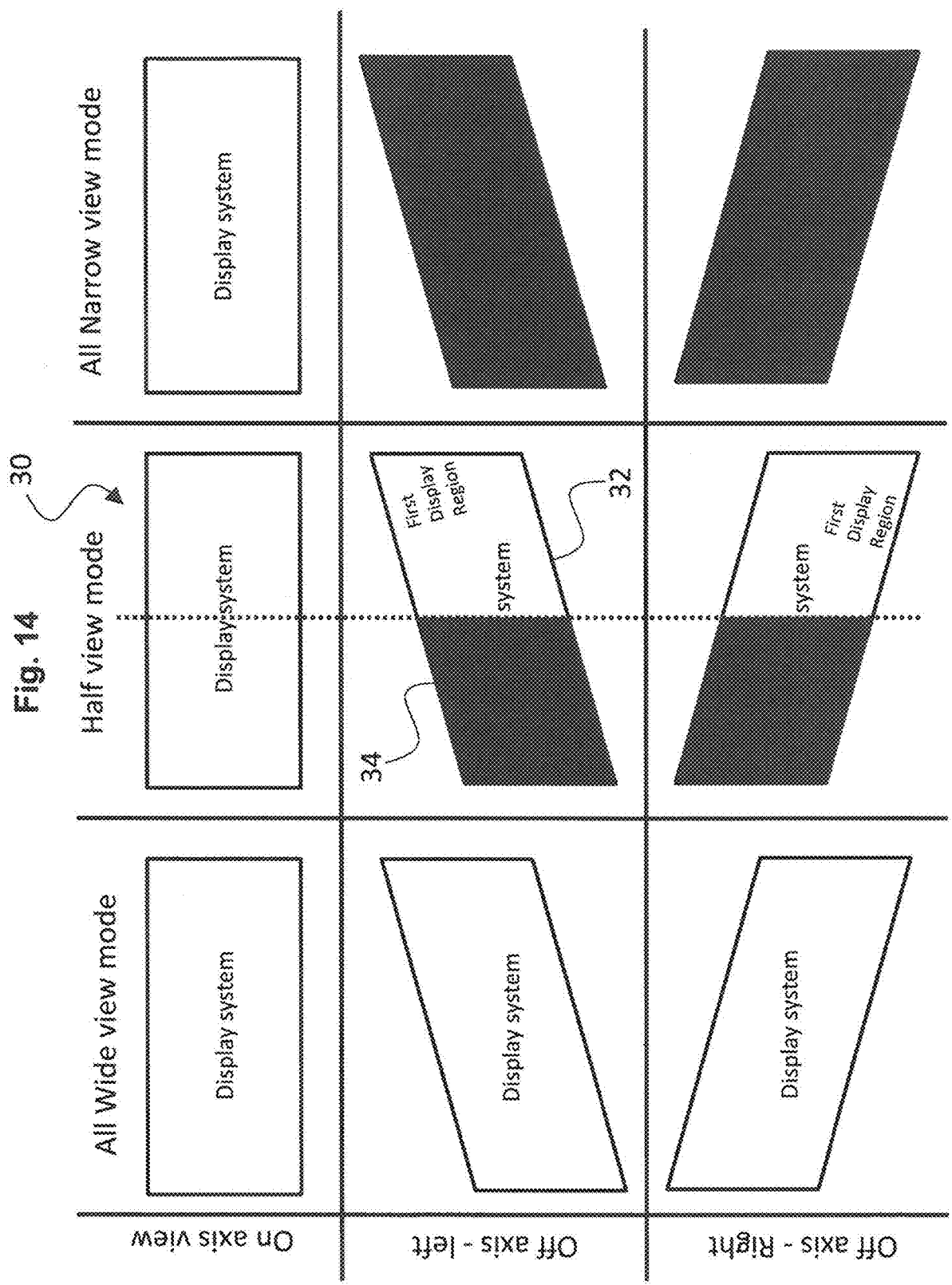
FIG. 14 is a drawing depicting a half view application of a display system configured in accordance with embodiments of the present invention.

FIG. 14 is a drawing depicting a half view application of a display system 30 configured in accordance with embodiments of the present invention. In this embodiment, the switchable ZBD view angle control LCD is changed so that at least two subsections or regions of the switchable view angle control LCD can be addressed separately. This enables different off-axis visibility of the subsections or regions of the display system. For example, the display system 30 may have a first display region 32 in which the switchable ZBD view angle control LCD is switched to enable a wide angle view mode (public mode), and a second display region 34 that is different from the first display region 32, and in which the switchable view angle control LCD is switched to enable a narrow angle view mode (private mode).

Figure 15:
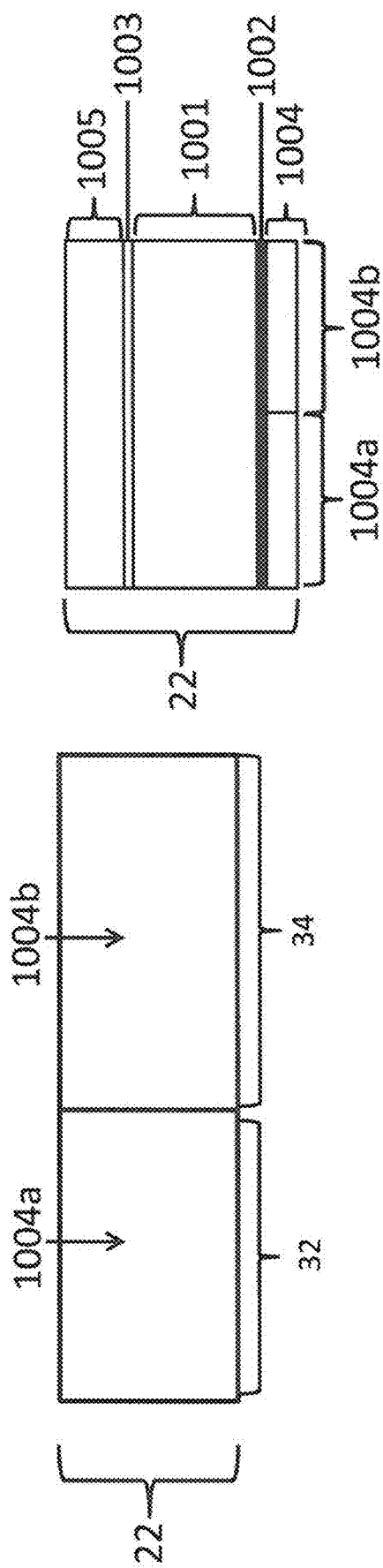
FIG. 15 is a drawing depicting an exemplary electrode configuration pertaining to the switchable view angle control LCD, the electrode configuration being patterned to enable the half view function depicted in FIG. 14.

FIG. 15 is a drawing depicting an exemplary electrode configuration pertaining to the switchable ZBD view angle control LCD, the electrode configuration being patterned to enable the half view function depicted in FIG. 14. This example is illustrated with reference to a modification of the structure depicted in FIG. 11. The specific structural change is the segmentation of an electrode on at least one of the two electrode substrates, either electrodes 1005 or 1004, or both. For example, the right side portion of FIG. 15 shows segmentation of electrode 1004 into electrode portions 1004*a* and 1004*b*. Accordingly, in a simplest case the display system is segmented into two regions, shown with one of the electrodes 1004 being patterned into a first electrode portion 1004*a* and a second electrode portion 1004*b*. As shown in the left side portion of FIG. 15, electrode areas 1004*a* and 1004*b* respectively may be associated with or correspond to the first display region 32 and the second display region 34 as depicted in FIG. 15.

Figure 16:
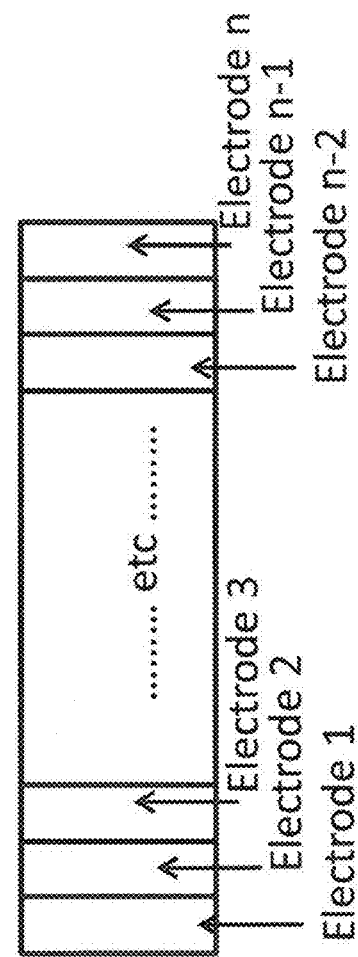
FIG. 16 is a drawing depicting how the electrode patterning of FIG. 15 may be expanded to any number of "n" electrodes.

FIG. 16 is a drawing depicting how the electrode patterning of FIG. 15 may be expanded to any number of "n" electrodes (electrode 1, 2, 3 . . . electrode n−2, electrode n−1, electrode n), which enables the size of the first display region and the second display region to be adjusted. This electrode patterning may be used to enable multiple first display regions and multiple second display regions. FIG. 16 illustrates an electrode layout for "n" separate columns of electrodes to enable variable width areas with different off-axis properties. This could be expanded from different electrode columns to different electrode rows and further to pixel addressing within the switchable view angle control LCD. Generally, therefore, the switchable view angle control LCD includes electrodes that are patterned so that a first region of the switchable view angle control LCD is operated in the first state and a second region of the switchable view angle control LCD is operated in the second state.

Figure 17:
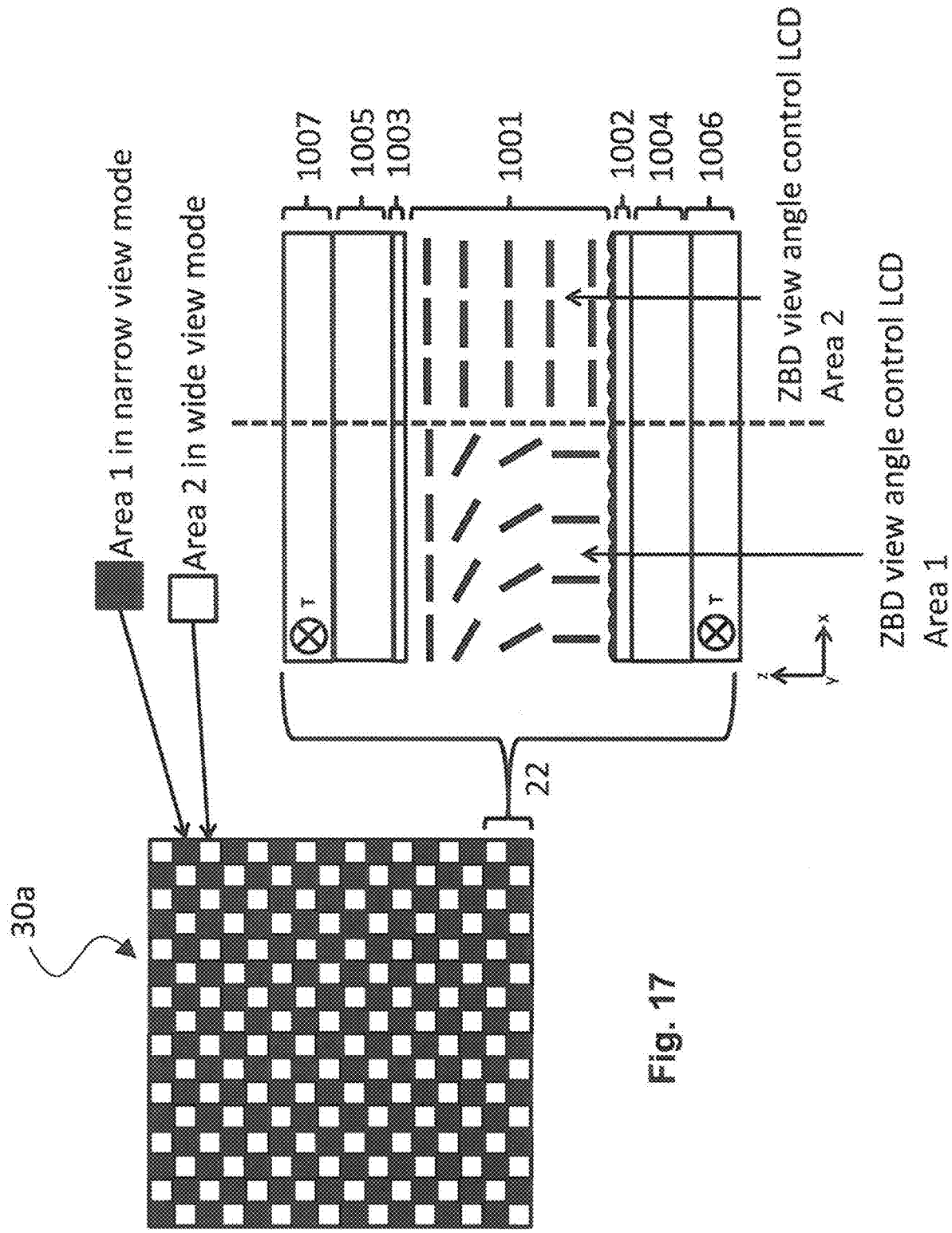
FIG. 17 is a drawing depicting an exemplary manner of addressing the ZBD view angle control LCD in a display system.

FIG. 17 is a drawing depicting a manner of addressing the ZBD view angle control LCD 22 in a display system 30a. In this example, the ZBD view angle control LCD 22 has a configuration comparably as depicted in FIG. 11. As illustrated in FIG. 17, the ZBD view angle control LCD 22 may be addressed so that different areas of the ZBD view angle control LCD 22 may be in different modes within the broader display system 30a. In the illustrated example, the ZBD view angle control LCD 22 is addressed to form a "checker board" pattern, which can be used in the private mode to provide obscuration of an image. For example, in FIG. 17 Area 1 corresponds to display areas functioning in a narrow angle view mode, which is generated by ZBD viewing angle control LCD Area 1. Similarly, Area 2 corresponds to display areas functioning in a wide angle view mode, which is generated by ZBD viewing angle control LCD Area 2.

It will be appreciated that the ZBD view angle control LCD 22 may be addressed to form any desirable geometry or different pattern as circumstances may warrant. For example, it may be beneficial to have the ZBD view angle control LCD 22 addressed so that a hexagonal pattern can be formed. It may be beneficial to have the ZBD view angle control LCD 22 addressed as a pattern of areas of wide and narrow angle view areas to provide a greater level of obfuscation than a uniformly addressed ZBD view angle control LCD. The wide angle view area may be a VAN mode or a planar aligned (ECB) nematic mode. The ZBD view angle control LCD may be addressed via an appropriate electrode structure so that at least two different modes from the following list are simultaneously selected: a wide angle view mode, a first narrow angle view mode, a second narrow angle view mode, and a third narrow angle view mode, such as described with respect to FIG. 13. The polarizers may be aligned in an O-mode or in an E-mode configuration.

Figure 18:
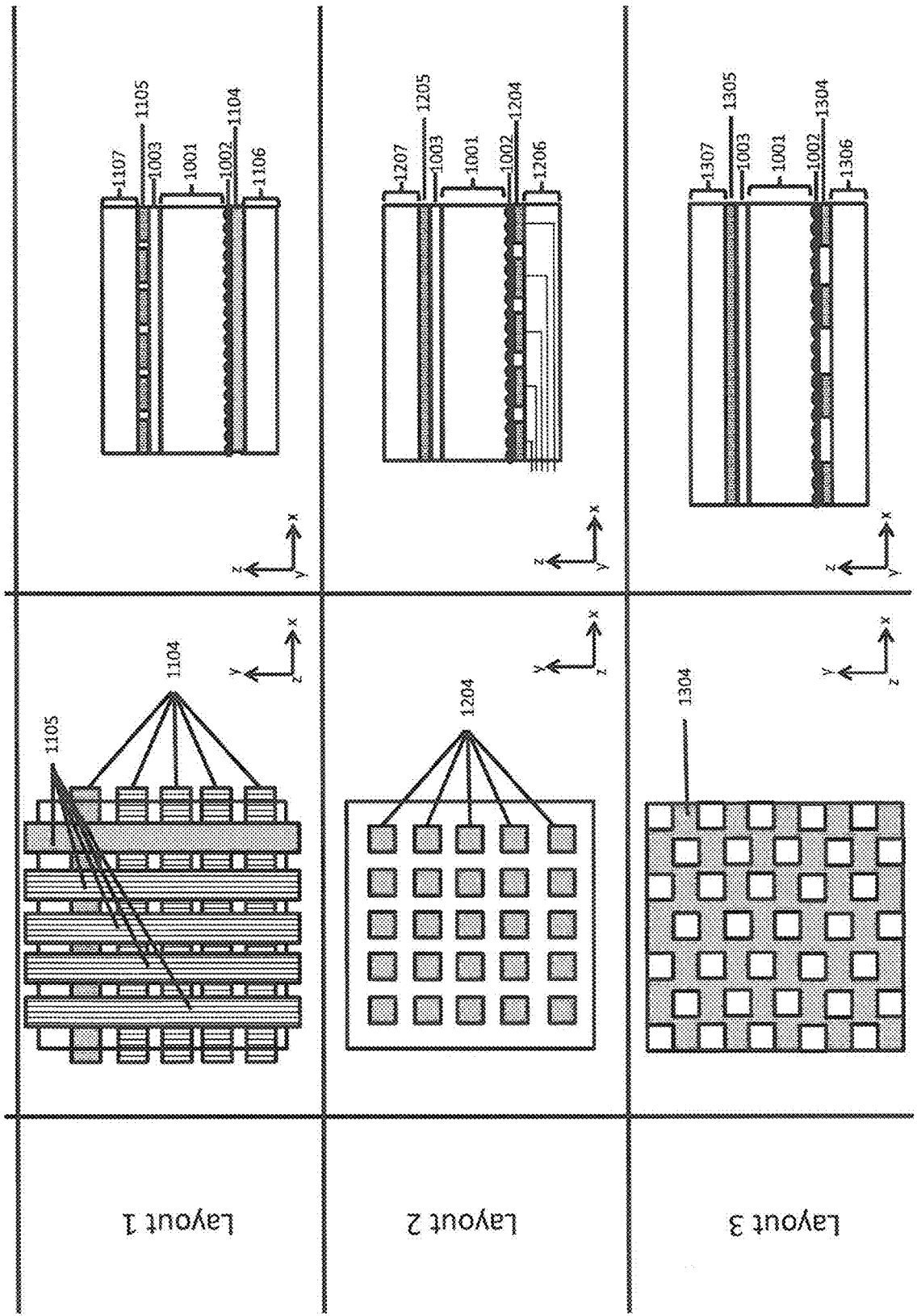
FIG. 18 is a drawing depicting exemplary layouts of electrode structures for addressing the ZBD view angle control LCD as described with respect to FIG. 17.

FIG. 18 is a drawing depicting exemplary layouts of electrode structures for addressing the ZBD view angle control LCD as described with respect to FIG. 17. While it may be possible to achieve the addressing of the ZBD view angle control LCD 22 using opaque TFTs, this may not be optimal for several reasons which may include additional cost, loss of light from additional black mask areas, and/or parallax between black mask areas of the image panel LCD and TFT addressed ZBD view angle control LCD. Furthermore, a TFT may be superfluous because of the bistable nature of the ZBD view angle control LCD.

FIG. 18 illustrates three layouts for potential addressing schemes for the ZBD view angle control LCD 22, which do not require pixel by pixel TFT addressing. Layout 1 illustrates a row and column scheme in which electrodes 1105 and 1104 on substrates 1107 and 1106 are patterned in such a manner as to enable a sub-area of the ZBD view angle control LCD to be addressed via a row (1104) and a column (1105). Layout 2 illustrates a direct driving scheme whereby each pixel electrode 1204 on substrate 1206 is individually addressed within substrate 1206. The other electrode 1205 on substrate 1207 may be a common electrode which may be globally addressed. Layout 3 illustrates a driving scheme whereby the electrode 1304 on substrate 1306 has been structured in such a manner as to enable switching of the ZBD view angle control LCD in some areas but prevents switching in other areas. Electrode 1305 on substrate 1307 is not patterned. Specifically, electrode 1304 has been patterned so that when a voltage is applied to substrate 1306 no voltage will be applied across the LC layer in some areas of the ZBD view angle control LCD 22 and consequently no switching will occur in said areas.

Figure 19:
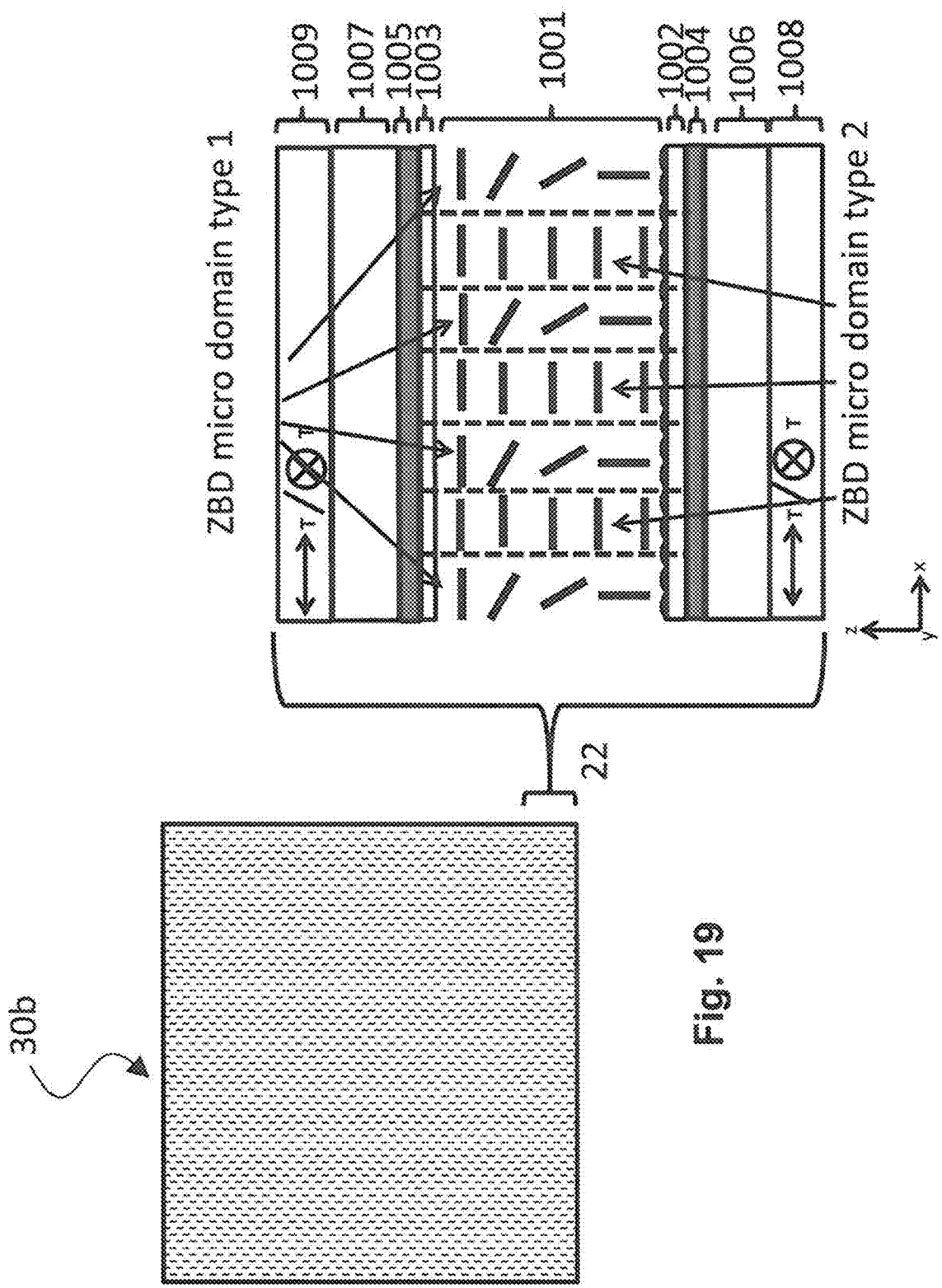
FIG. 19 is a drawing depicting exemplary switching associated with the ZBD view angle control LCD.

FIG. 19 is a drawing depicting exemplary switching associated with the ZBD view angle control LCD in a display system 30b. The ZBD view angle control LCD has a configuration comparable to that in FIGS. 4-6 utilizing the polarizers 1008 and 1009. FIG. 19 illustrates the manner by which a pulse voltage applied to the ZBD view angle control LCD is approximately at the switching threshold (i.e., $V_{pulse} \approx V_{threshold}$). In this case some small domains of the ZBD view angle control LCD are switched to the second state, while other domains remain in their previous state. Consider the case where The ZBD device was in an ECB state and a pulse has been supplied to switch the device it to a HAN (vertical alignment at bistable alignment layer, planar alignment at the monostable substrate) state. In this case the magnitude of this pulse is approximately equal to the threshold voltage, resulting in microdomains. In FIG. 19 ZBD micro domain type 1 would represent an area where switching has been unsuccessful while ZBD micro domain type 2 would represent a domain which has switch successfully. Accordingly, the ZBD view angle control LCD is configured to receive a voltage pulse essentially equal to a switching threshold voltage, wherein a first micro domain corresponds to an unswitched area of the ZBD view angle control LCD, and a second micro domain corresponds to a switched area of the ZBD view angle control LCD. Switching the ZBD view angle control LCD in this manner may provide a similar or greater level of obfuscation than an addressed ZBD view angle control LCD while not requiring patterned electrodes. The wide angle view area may be a VAN mode or a planar aligned nematic mode. The polarizers may be aligned in an O-mode configuration or may be aligned in an E-mode configuration.

FIG. 20 is a drawing depicting an asymmetric view angle control in accordance with embodiments of the present invention, utilizing a layer structure comparably as in FIGS. 4-6 having the polarizers 1008 and 1009. An asymmetric view angle control functionality can be added by changing the surface LC alignment structure so that there is a pretilt on the vertically aligned substrate of the HAN configuration. In such configuration, the direction of the pretilt is not parallel to the director at the planar substrate. In such configuration, the direction of the pretilt may be perpendicular to the director at the planar substrate. The angle of the pretilt determines the offset angle of the asymmetry of the view angle control. In contrast to the previous cases, in the asymmetric HAN (also known as a TN HAN) on-axis light observes some birefringence and undergoes polarization change, while off-axis light with an internal angle equal to the pretilt of the liquid crystal does not undergo polarization change. The effect of this is to offset the luminance profile and consequently make the privacy profile asymmetric. This can be seen in the graphical portion of FIG. 20 whereby the normal HAN has a symmetric luminance profile but the TN HAN has an asymmetric profile. The degree of the asymmetry of the view angle control is proportional to the angle of the pretilt. FIG. 20 presents a configuration where by the device where one of the alignment layers is a bistable type alignment layer and the other is a monostable with vertical alignment. The same asymmetric view angle functionality can be achieved with a device where both the alignment layers are bistable type alignment layers or a device where one alignment layer is a bistable type alignment layer and the second alignment layer is a monostable alignment layer with planar type alignment. In the first case with two bistable type alignment layers the asymmetric view angle control functionality can be achieved so long as the vertical alignment state of at least one of the bistable alignment layers has a pretilt in a direction perpendicular to the planar alignment direction of the other bistable alignment layer. In the second case with one bistable type alignment layer and one planar type monostable alignment layer the asymmetric view angle control functionality can be achieved so long as the vertical alignment state the bistable alignment layers has a pretilt in a direction perpendicular to the planar alignment direction of the other alignment layer. The LC pretilt may be in the range on the 90° (vertically aligned)-70° for the TN HAN, as seen in the graphical portion of FIG. 20.

FIG. 21 is a chart depicting a summary of exemplary configurations and associated view angle modes that are achievable using the ZBD view angle control LCD in accordance with embodiments of the present invention. With reference to FIG. 21, Configuration 1 has a bistable alignment layer and a monostable alignment layer. The monostable alignment layer is a planar type LC alignment layer. The polarizers in Configuration 1 may be aligned parallel to the liquid crystal LC director at the monostable planar interface, or may be aligned perpendicular to the LC director at the monostable planar interface.

Configuration 1 has a wide angle view mode that is an ECB mode corresponding to when the bistable alignment layer is in the planar state. Configuration 1 has three unique narrow angle view modes (NVM1, NVM2 and NVM3). The first narrow angle view mode is a HAN mode in which the HAN state is achieved when the bistable alignment layer is in the vertical state. The second narrow angle view mode is a HAN mode in which a bias voltage has been applied ($V_{bias}$) to the ZBD LC material by the electrode layers. The magnitude of $V_{bias}$ is in the range 0.5 V to 10 V. $V_{bias}$ may be an AC electric field or may be a DC type electric field. The third narrow angle view mode is an ECB mode in which a bias voltage has been applied ($V_{bias}$) to the structure by the electrode layers. The magnitude of $V_{bias}$ is in the range 0.5 V to 10 V. $V_{bias}$ may be an AC electric field or may be a DC type electric field. At least two of the viewing modes associated with Configuration 1 may be simultaneously selected in at least two different spatial regions of the switchable ZBD view angle control LCD.

Further with reference to FIG. 21, Configuration 2 has a bistable alignment layer and a monostable alignment layer. In Configuration 2 the monostable layer is a vertical type alignment layer. The polarizers in Configuration 2 may be aligned parallel to the liquid crystal director when the bistable surface is in the planar state, or may be aligned perpendicular to the LC director when the bistable surface is in the planar state.

Configuration 2 has one wide angle view mode that is a VAN mode with optical compensation layers. The optical compensation layers may be negative C-plate retarder layers. The retardation of the VAN mode may be more, less or equal to the retardation of the negative C-plate retarder layers. The retardation value of the negative C-plate retarder layer may be within ±50% of the retardation value of the LC layer pertaining to the view angle control LCD 22. Configuration 2 is in the wide angle view mode when the bistable alignment layer is in the vertical state. The structure has two unique narrow angle view modes (NVM1 and NVM2). The first narrow angle view mode is a HAN mode, and in the HAN mode the bistable alignment layer is in the planar state. The second narrow angle view mode is a HAN mode in which a bias voltage has been applied ($V_{bias}$) to the ZBD LC material by the electrode layers. The magnitude of $V_{bias}$ is in the range 0.5 V to 10 V. $V_{bias}$ may be an AC electric field or may be a DC type electric field. Configuration 2 can be adapted to give an asymmetric viewing window by inducing a tilt at the vertical monostable alignment layer non-parallel to the alignment direction of the bistable alignment layer in the planar state. At least two of the viewing modes associated with Configuration 2 may be simultaneously selected in at least two different spatial regions of the switchable ZBD View angle control LCD.

Further with reference to FIG. 21, Configuration 3 has two bistable alignment layers. The polarizers in Configuration 3 may be aligned parallel to the liquid crystal director at the planar interface (i.e. when at least one bistable alignment layer is in the planar state), or may be aligned perpendicular to the director at the planar interface (i.e. when at least one bistable alignment layer is in the planar state).

Configuration 3 has one wide angle view mode that is an ECB mode. Configuration 3 is in the ECB mode when both bistable alignment layers are in the planar state. Configuration 3 has four unique narrow angle view modes (NVM1, NVM2, NVM3 and NVM4). The first narrow angle view mode is a HAN mode that is achieved when one bistable alignment layer is in a vertical state and the other bistable alignment layer is in a planar state. The second narrow angle view mode is a HAN mode in which a bias voltage ($V_{bias}$) has been applied to the ZBD LC material by the electrode layers. The magnitude of $V_{bias}$ is in the range 0.5 V to 10 V (i.e. below the bistable switching threshold of the ZBD $V_{threshold}$). $V_{bias}$ may be an AC electric field or may be a DC type electric field. The third narrow angle view mode is a ECB mode in which a bias voltage ($V_{bias}$) has been applied to the structure by the electrode layers. The magnitude of $V_{bias}$ the range 0.5 V to 10. $V_{bias}$ may be an AC electric field or may be a DC type electric field. The fourth narrow angle view mode is a VAN mode that is achieved when both bistable alignment layers are in the vertical state. At least two of the viewing modes associated with Configuration 3 may be simultaneously selected in at least two different spatial regions of the Switchable ZBD View angle control LCD.

Further with reference to FIG. 21, Configuration 4 has two bistable alignment layers. The polarizers in Configuration 4 may be aligned parallel to the liquid crystal director at the planar interface (i.e. when at least one bistable alignment layer is in the planar state), or may be aligned perpendicular to the director at the planar interface (i.e. when at least one bistable alignment layer is in the planar state).

Configuration 4 has one wide angle view mode that is a VAN mode with optical compensation layers. The optical compensation layers may be negative C-plate retarder layers. The retardation of the VAN mode may be more, less or equal to the retardation of the negative C-plate retarder layers. The retardation value of the negative C-plate retarder layer may be within ±50% of the retardation value of the LC layer pertaining to the view angle control LCD 22. Configuration 3 is in the VAN mode when both bistable alignment layers are in the vertical state. Configuration 4 has four unique narrow angle view modes (NVM1, NVM2, NVM3 and NVM4). The first narrow angle view mode is a HAN mode that is achieved when one bistable alignment layer is in a vertical state and the other bistable alignment layer is in a planar state. The second narrow angle view mode is a HAN mode in which a bias voltage ($V_{bias}$) has been applied to the ZBD LC material by the electrode layers. The magnitude of $V_{bias}$ is in the range 0.5 V to 10 V. $V_{bias}$ may be an AC electric field or may be a DC type electric field. The third narrow angle view mode is a ECB mode that is achieved when both bistable alignment layers are in the planar state. The fourth narrow angle view mode is a ECB mode in which a bias voltage ($V_{bias}$) has been applied to the structure by the electrode layers. The magnitude of $V_{bias}$ the range 0.5 V to 10 V. $V_{bias}$ may be an AC electric field or may be a DC type electric field. At least two of the viewing modes associated with Configuration 4 may be simultaneously selected in at least two different spatial regions of the switchable ZBD View angle control LCD.

Figure 22:
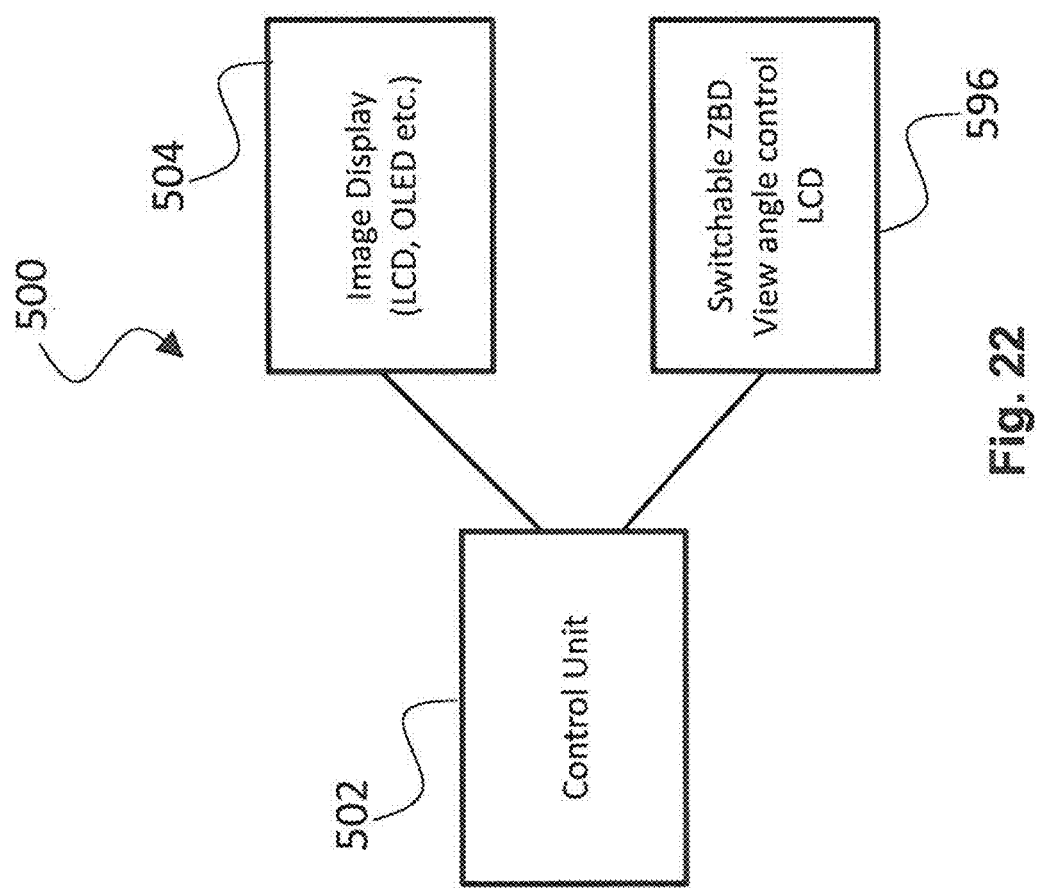
FIG. 22 is a block diagram depicting an overview of an exemplary display system, including a control unit, an image display, and a switchable ZBD View angle control LCD in accordance with any of the embodiments.

FIG. 22 is a block diagram depicting an overview of an exemplary display system 500, including a control unit 502, an image display 504, and a switchable ZBD view angle control LCD 506 in accordance with any of the embodiments. The control unit 502 controls the operation of the display system, including providing image data that controls the image that is displayed on the image display 504. The image display 504 may be any suitable type of image display, such as any of the LCD type or emissive type image displays referenced above. The control unit 502 controls driving and the subsequent view angle mode of the switchable ZBD view angle control LCD 506. The control unit may control the driving of the switchable ZBD View angle control LCD 506 dependent upon the image data supplied to the image display 504, and/or dependent upon an external input from a user or sensor.

In accordance with any of the embodiments, the control unit may control the switchable ZBD view angle control LCD such that the ZBD view angle control LCD is switchable between a wide angle view mode and at least a second viewing mode selected from following: a first narrow angle view mode, a second narrow angle view mode, a third narrow angle view mode, and a fourth narrow angle view mode, wherein each of the said viewing angle modes has a different viewing angle range. The manner for achieving the different narrow angle view modes has been described with respect to the various embodiments, as exemplified in the chart of FIG. 21. The control unit further may control the switchable ZBD view angle control LCD such that the ZBD view angle control LCD has a wide angle viewing mode in at least a first region of the image display, and has at least a second viewing mode selected from following list in at least a second region of the image display: a first narrow angle view mode, a second narrow angle view mode, a third narrow angle view mode, and a fourth narrow angle view mode, wherein each of the said viewing angle modes has a different viewing angle range.

The control unit further may control the switchable ZBD view angle control LCD such that the ZBD view angle control LCD has a least two different viewing modes selected from the following list in at least two different regions of the image display: a first narrow angle view mode, a second narrow angle view mode, a third narrow angle view mode, and a fourth narrow angle view mode, wherein each of the said viewing angle modes has a different viewing angle range. The control unit further may control the switchable ZBD view angle control LCD such that the ZBD view angle control LCD has a least a wide angle view mode in at least a first region of the image display, and has at least two different viewing modes selected from following list in at least two different regions of the image display: a first narrow angle view mode, a second narrow angle view mode, a third narrow angle view mode, and a fourth narrow angle viewing mode, wherein each of the said viewing angle modes has a different viewing angle range.

An aspect of the invention, therefore, is a switchable view angle control device that provides an enhanced private mode while maintaining a high quality public mode as compared to conventional configurations. In exemplary embodiments, the switchable view angle control device includes an electrically switchable zenithal bistable liquid crystal display view angle control liquid crystal device (ZBD view angle control LCD) that is operable in a first state and a second state; a front polarizer located on a viewing side of the switchable ZBD view angle control LCD; and a polarized light source located on a non-viewing side of the switchable ZBD view angle control LCD that emits light that is polarized in a first direction. When the switchable ZBD view angle control LCD in the first state, the view angle control device operates in a narrow angle view mode in which the polarization of the light from the polarized light source is changed by the switchable ZBD view angle control LCD to be polarized in a second direction that is at least partially absorbed by the front polarizer, and on-axis light passes through the switchable ZBD view angle control LCD and the front polarizer. When the switchable ZBD view angle control LCD is in the second state, the view angle control device operates in a wide angle view mode in which the polarization state of the light from the polarized light source is not changed by the switchable ZBD view angle control LCD and passes through the front polarizer. The switchable view angle control device may include one or more of the following features, either individually or in combination.

In an exemplary embodiment of the switchable view angle control device, the ZBD view angle control LCD comprises: a first electrode substrate; a bistable alignment layer deposited on the first electrode substrate; a second electrode substrate; a second alignment layer deposited on the second electrode substrate; and a liquid crystal layer positioned between the bistable alignment layer and the second alignment layer.

In an exemplary embodiment of the switchable view angle control device, the ZBD view angle control LCD further comprises a first polarizer located on the first electrode substrate opposite from the bistable alignment layer, and a second polarizer located on the second electrode substrate opposite from the second alignment layer, wherein the first and second polarizers have a same transmission axis direction.

In an exemplary embodiment of the switchable view angle control device, the transmission axis of the first and second polarizers is parallel to an orientation of the liquid crystal alignment at the bistable alignment layer.

In an exemplary embodiment of the switchable view angle control device, the transmission axis of the first and second polarizers is perpendicular to an orientation of the liquid crystal alignment at the bistable alignment layer.

In an exemplary embodiment of the switchable view angle control device, the second alignment layer is a monostable planar alignment layer.

In an exemplary embodiment of the switchable view angle control device, the second alignment layer is a monostable vertical alignment layer.

In an exemplary embodiment of the switchable view angle control device, the second alignment layer is another bistable alignment layer.

In an exemplary embodiment of the switchable view angle control device, the ZBD view angle control LCD is configured to receive a bias voltage to adjust the viewing angle when the switchable view angle control device is in the narrow angle view mode.

Another aspect of the invention is a display system that includes an includes an electrically switchable zenithal bistable liquid crystal display view angle control liquid crystal device (ZBD view angle control LCD) that is operable in a first state and a second state, and an image panel. When the switchable ZBD view angle control LCD is in the first state, the display system operates in a narrow angle view mode in which at least a portion of off-axis light is blocked and on-axis light passes through the switchable view angle control LCD to be emitted by the display system. When the switchable ZBD view angle control LCD is in the second state, the display system operates in a wide angle view mode in which the switchable view angle control LCD does not block the on-axis light and off-axis light. The display system may include one or more of the following features, either individually or in combination.

In an exemplary embodiment of the display system, the image panel is a liquid crystal image panel, and the display system further includes a backlight located on a non-viewing side of the display system relative to the liquid crystal image panel.

In an exemplary embodiment of the display system, an order of components from a viewing side of the display system comprises the liquid crystal image panel, the switchable ZBD view angle control LCD, and the backlight.

In an exemplary embodiment of the display system, an order of components from a viewing side of the display system comprises the switchable ZBD view angle control LCD, the liquid crystal image panel, and the backlight.

In an exemplary embodiment of the display system, the image panel comprises an emissive image panel located on a non-viewing side of the switchable ZBD view angle control LCD.

In an exemplary embodiment of the display system, the ZBD view angle control LCD is configured to receive a bias voltage to adjust a viewing angle when the switchable ZBD view angle control LCD is in the first state, In an exemplary embodiment of the display system, the switchable ZBD view angle control LCD includes electrodes that are patterned so that a first region of the switchable ZBD view angle control LCD is operated in the first state and a second region of the switchable ZBD view angle control LCD is operated in the second state.

In an exemplary embodiment of the display system, the electrodes are patterned in a manner that enables a sub-area of the ZBD view angle control LCD to be addressed by row and/or column.

In an exemplary embodiment of the display system, the electrodes include pixel electrodes and a common electrode that permit individually addressing sub-areas of the ZBD view angle control LCD.

In an exemplary embodiment of the display system, the ZBD view angle control LCD is configured to receive a voltage pulse equal to a switching threshold voltage, wherein a first micro domain corresponds to an unswitched area of the ZBD view angle control LCD and a second micro domain corresponds to a switched area of the ZBD view angle control LCD.

In an exemplary embodiment of the display system, the switchable ZBD view angle control LCD is configured to have an asymmetric viewing window when operated in the first state.

In an exemplary embodiment of the display system, the ZBD view angle control LCD comprises: a first electrode substrate; a bistable alignment layer deposited on the first electrode substrate; a second electrode substrate; a second alignment layer deposited on the second electrode substrate; and a liquid crystal layer positioned between the bistable alignment layer and the second alignment layer.

In an exemplary embodiment of the display system, the ZBD view angle control LCD further comprises a first polarizer located on the first electrode substrate opposite from the bistable alignment layer, and a second polarizer located on the second electrode substrate opposite from the monostable alignment layer, wherein the first and second polarizers have a same transmission axis direction.

In an exemplary embodiment of the display system, the transmission axis of the first and second polarizers is parallel to the orientation of the liquid crystal alignment at the bistable alignment layer in the planar state.

In an exemplary embodiment of the display system, the transmission axis of the first and second polarizers is perpendicular to the orientation of the liquid crystal alignment at the bistable alignment layer in the planar state.

In an exemplary embodiment of the display system, the second alignment layer is a monostable planar alignment layer.

In an exemplary embodiment of the display system, the second alignment layer is a monostable vertical alignment layer.

In an exemplary embodiment of the display system, the second alignment layer is another bistable alignment layer.

In an exemplary embodiment of the display system, the vertically aligned surface of at least one of the hybrid aligned nematic (HAN) states of the switchable ZBD view angle control LCD has a pretilt in a direction not parallel to the planar alignment direction at the other alignment layer.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention are applicable to many display devices in which a strong narrow angle view private mode is desirable in additional to a wide angle view public mode. A strong private mode in particular is desirable for portable electronic display devices that are commonly used in a public setting. Examples of such devices include mobile phones including smartphones, personal digital assistants (PDAs), and tablet and laptop computers.

REFERENCE SIGNS LIST

10—liquid crystal device (LCD) configuration
12—backlight

14—light
16—view angle control film
18—liquid crystal display (LCD) image panel
20—LCD device configuration
20a—LCD device configuration
20b—LCD device configuration
22—switchable ZBD view angle control LCD
24—emissive image panel
30—display system
30a—display system
30b—display system
32—first display region
34—second display region
100a—display system
100b—display system
100c—display system
101—front polarizer for first component
102—rear polarizer for first component
201—front polarizer for second component
202—rear polarizer for second component
301—front polarizer for third component
302—rear polarizer for third component
401—first spacer layer
402—second spacer layer
500—exemplary display system
502—control unit
504—image display
506—switchable ZBD view angle control LCD
1001—liquid crystal cell or LC layer
1002—bistable alignment layer
1002a—bistable alignment layer
1002b—bistable alignment layer
1003—monostable alignment layer
1004—first electrode layer
1004a—first electrode portion
1004b—second electrode portion
1005—second electrode layer
1006—first electrode substrate
1007—second electrode substrate
1008—rear polarizer
1009—front polarizer
1104—electrode rows
1105—electrode columns
1106—substrate
1107—substrate
1204—pixel electrode
1205—common electrode
1206—substrate
1207—substrate
1304—patterned electrode
1305—non-patterned electrode
1306—substrate

What is claimed is:

1. A switchable view angle control device comprising:
an electrically switchable zenithal bistable liquid crystal display view angle control liquid crystal device (ZBD view angle control LCD) that is operable in a first state and a second state;
a front polarizer located on a viewing side of the switchable ZBD view angle control LCD; and
a polarized light source located on a non-viewing side of the switchable ZBD view angle control LCD that emits light that is polarized in a first direction;
wherein when the switchable ZBD view angle control LCD in the first state, the view angle control device operates in a narrow angle view mode in which the polarization of off-axis light from the polarized light source is changed by the switchable ZBD view angle control LCD to be polarized in a second direction so that it is at least partially absorbed by the front polarizer, while on-axis light passes through the switchable ZBD view angle control LCD and the front polarizer;
wherein when the switchable view angle control LCD is in the second state, the view angle control device operates in a wide angle view mode in which the polarization state of the off-axis polarized light from the polarized light source is unchanged by the switchable ZBD view angle control LCD and passes through the front polarizer; and
wherein the ZBD view angle control LCD includes a liquid crystal layer, and in the narrow angle view mode the liquid crystal layer has a hybrid aligned nematic configuration in which the liquid crystal layer is aligned planar at one alignment interface and vertical at an opposite alignment interface, and in the wide angle view mode the liquid crystal layer has a configuration in which the liquid crystal layer is aligned the same at both alignment interfaces;
wherein the ZBD view angle control LCD comprises:
a first electrode substrate;
a bistable alignment layer deposited on the first electrode substrate;
a second electrode substrate;
a second alignment layer deposited on the second electrode substrate; and
the liquid crystal layer is positioned between the bistable alignment layer and the second alignment layer; and
a first polarizer located on the first electrode substrate opposite from the bistable alignment layer and a second polarizer located on the second electrode substrate opposite from the second alignment layer, wherein the first and second polarizers have a same transmission axis direction and the transmission axis of the first and second polarizers is perpendicular to an orientation of the liquid crystal alignment at the bistable alignment layer.

2. The switchable view angle control device of claim 1, wherein the second alignment layer is a monostable planar alignment layer.

3. The switchable view angle control device of claim 1, wherein the second alignment layer is a monostable vertical alignment layer.

4. The switchable view angle control device of claim 1, wherein the second alignment layer is another bistable alignment layer.

5. The switchable view angle control device of claim 1, wherein the ZBD view angle control LCD is configured to receive a bias voltage to adjust the viewing angle when the switchable view angle control device is in the narrow angle view mode, and the bias voltage is below a bistable switching threshold that switches the ZBD view angle control LCD.

6. The switchable view angle control device of claim 1, wherein the ZBD view angle control LCD has a retardance ($d\Delta n$) between 2500 nm and 25 μm.

7. A display system comprising:
an electrically switchable zenithal bistable liquid crystal display view angle control liquid crystal device (ZBD view angle control LCD) that is operable in a first state and a second state; and
an image panel, and
wherein when the switchable ZBD view angle control LCD is in the first state, the display system operates in a narrow angle view mode in which at least a portion of off-axis light is blocked and on-axis light passes through the switchable view angle control LCD to be emitted by the display system; and wherein when the switchable ZBD view angle control LCD is in the second state, the display system operates in a wide angle view mode in which the switchable view angle control LCD does not block the on-axis light and off-axis light; and wherein the ZBD view angle control LCD includes a liquid crystal layer, and in the narrow angle view mode the liquid crystal layer has a hybrid aligned nematic configuration in which the liquid crystal layer is aligned planar at one alignment interface and vertical at an opposite alignment interface, and in the wide angle view mode the liquid crystal layer has a configuration in which the liquid crystal layer is aligned the same at both alignment interfaces;

wherein the ZBD view angle control LCD comprises:
a first electrode substrate;
a bistable alignment layer deposited on the first electrode substrate;
a second electrode substrate;
a second alignment layer deposited on the second electrode substrate; and
the liquid crystal layer is positioned between the bistable alignment layer and the second alignment layer; and
a first polarizer located on the first electrode substrate opposite from the bistable alignment layer and a second polarizer located on the second electrode substrate opposite from the monostable alignment layer, wherein the first and second polarizers have a same transmission axis direction and the transmission axis of the first and second polarizers is perpendicular to the orientation of the liquid crystal alignment at the bistable alignment layer in the planar state.

8. The display system of claim 7, wherein the image panel is a liquid crystal image panel, and the display system further includes a backlight located on a non-viewing side of the display system relative to the liquid crystal image panel.

9. The display system of claim 8, wherein an order of components from a viewing side of the display system comprises the liquid crystal image panel, the switchable ZBD view angle control LCD, and the backlight.

10. The display system of claim 8, wherein an order of components from a viewing side of the display system comprises the switchable ZBD view angle control LCD, the liquid crystal image panel, and the backlight.

11. The display system of claim 7, wherein the image panel comprises an emissive image panel located on a non-viewing side of the switchable ZBD view angle control LCD.

12. The display system of claim 7, wherein the ZBD view angle control LCD is configured to receive a bias voltage to adjust a viewing angle when the switchable ZBD view angle control LCD is in the first state, and the bias voltage is below a bistable switching threshold that switches the ZBD view angle control LCD.

13. The display system of claim 7, wherein the switchable ZBD view angle control LCD includes electrodes that are patterned so that a first region of the switchable ZBD view angle control LCD is operated in the first state and a second region of the switchable ZBD view angle control LCD is operated in the second state.

14. The display system of claim 13, wherein the electrodes are patterned in a manner that enables a sub-area of the ZBD view angle control LCD to be addressed by row and/or column.

15. The display system of claim 13, wherein the electrodes include pixel electrodes and a common electrode that permit individually addressing sub-areas of the ZBD view angle control LCD.

16. The display system of claim 13, wherein the ZBD view angle control LCD is configured to receive a voltage pulse equal to a switching threshold voltage, wherein a first micro domain corresponds to an unswitched area of the ZBD view angle control LCD and a second micro domain corresponds to a switched area of the ZBD view angle control LCD.

17. The display system of claim 7, wherein the switchable ZBD view angle control LCD is configured to have an asymmetric viewing window when operated in the first state.

18. The display system of claim 7, wherein the second alignment layer is a monostable planar alignment layer.

19. The display system of claim 18, wherein the vertically aligned surface of at least one of the hybrid aligned nematic (HAN) states of the switchable ZBD view angle control LCD has a pretilt in a direction not parallel to the planar alignment direction at the other alignment layer.

20. The display system of claim 7, wherein the second alignment layer is a monostable vertical alignment layer.

21. The display system of claim 7, wherein the second alignment layer is another bistable alignment layer.

* * * * *